ASSOCIATIVE MEMORY

Filed June 26, 1961 17 Sheets-Sheet 1

INVENTORS
HAROLD FLEISHER
ROBERT I. ROTH
BY Curtis Ailes Jr.
ATTORNEY

Nov. 30, 1965 H. FLEISHER ETAL 3,221,157

ASSOCIATIVE MEMORY

Filed June 26, 1961 17 Sheets-Sheet 2

Nov. 30, 1965 H. FLEISHER ETAL 3,221,157

ASSOCIATIVE MEMORY

Filed June 26, 1961 17 Sheets-Sheet 3

ASSOCIATIVE MEMORY

Filed June 26, 1961 17 Sheets-Sheet 6

Nov. 30, 1965 H. FLEISHER ETAL 3,221,157

ASSOCIATIVE MEMORY

Filed June 26, 1961 17 Sheets-Sheet 10

Nov. 30, 1965 H. FLEISHER ET AL 3,221,157

ASSOCIATIVE MEMORY

Filed June 26, 1961 17 Sheets-Sheet 11

ASSOCIATIVE MEMORY

United States Patent Office 3,221,157

Patented Nov. 30, 1965

3,221,157
ASSOCIATIVE MEMORY

Harold Fleisher, Poughkeepsie, and Robert I. Roth, Briarcliff Manor, N.Y., assignors to International Business Machines Corporation, New York, N.Y., a corporation of New York Filed June 26, 1961, Ser. No. 119,719
5 Claims. (Cl. 235—184)

This invention relates to an improved memory apparatus for computers in which information stored in the memory may be very rapidly identified in terms of an association or correspondence between the stored information and certain given information.

In most conventional computers and computing systems, data are stored in groups of digits which may be identified as "words" and storage positions for various words are identified by storage "addresses." Such addresses are of fixed length and the only access to the stored information is by instruction to the machine to proceed to the required address for the desired information. Various prior proposals have been made to gain access to the information stored in a computer memory on the basis of association between a word stored in an association register and certain portions of the data stored in each of the various words in memory. These prior associative memory systems have generally required a laborious search of all of the words in memory, one at a time, in order to identify and then read out each word meeting the association test.

Accordingly, one object of the present invention is to provide an improved associative memory in which all of the words in memory are tested for the association, and in which the selection of all such words which meet the association test is rapidly indicated in essentially one parallel operation.

In prior associative memory systems as mentioned above, the association operation is carried out with certain apparatus and in a certain time period on each of the various words in memory. After the association identification or selection has been made, other apparatus may be employed at a later time for the purpose of reading the associatively selected information out of the memory.

It is another object of this invention to provide an improved associative memory system in which common apparatus is employed for the association and read out functions.

Another object of this invention is to provide an improved associative memory system in which the association function and the read out function are combined in what is essentially a single operating step.

In carrying out the above objects of the invention in one preferred form thereof, a memory system is provided including apparatus for storing a plurality of digital characters in rows forming data words and having corresponding word characters arranged to form columns. Associative selection apparatus is provided for receiving association information, and such apparatus is immediately operable in response to receipt of such information to indicate a selection of all words which correspond thereto.

In prior calculating and computing apparatus, whether employing associative memory addressing or conventional addressing, arithmetic apparatus which is physically separate from memory is generally employed. The result is that data to be used in computation must be called for by address in memory and transmitted to the arithmetic unit for such computation. The result is transmitted back to memory storage and the sequence of operation is repeated for the next computation. In these systems, a tremendous amount of operating time in consumed in fetching data from memory and transmitting it to the arithmetic units, and in carrying the results back to the memory. As the switching speeds of available switching components increase, the time consumed in fetching and carrying data between the memory and the arithmetic units becomes more and more of a problem in limiting operating speeds.

Furthermore, the number of words which conventional computer arithmetic units are capable of handling simultaneously is generally quite limited, even for operations as simple as the formation of sums. The arithmetic unit capacity is generally limited to two numerical words or multi-digit numbers. Thus, in order to form a sum of a large number of numerical words, it is necessary to fetch each word from memory in a separate step, add that word to the previous sum, and then repeat the operation of "fetch and add" for each word to be included in the sum. This is obviously a lengthy process in terms of the number of machine logical operating steps required as it constitutes a long sequence of repeated operations.

Accordingly, it is another object of the present invention to provide an associative calculating memory in which the storage and calculating apparatus is essentially combined to avoid the necessity for repeated fetching of words which are to enter into the calculations.

Another object of the present invention is to provide an associative calculating memory which employs improved structural features and which is directed to the solution of the problems mentioned above.

Another object of the present invention is to provide an associative calculating memory system which can be embodied to take full advantage of the desirable characteristics of inexpensive four-terminal variable impedance devices such as cryotrons.

Another object of the present invention is to provide an associative calculating memory system which is capable of rapid parallel addition of any number of the words associatively selected from memory.

Another object of the present invention is to provide a calculating memory system which is capable of rapid parallel addition of all of an associatively selected group of characters stored in the memory, and in which the selected character group may be limited to selected fields within the words associatively selected.

Another feature of the present invention is in the provision for obtaining an accurate and immediate count of all words selected by the association operation, the count being formed at the time the association operation takes place.

Another important feature of the present invention is in the provision for computations which may proceed immediately as the association operation occurs, such computations being based upon information provided as a result of the association. Such information may include the count of associatively selected words, a common value or factor which may be contained in the associatively selected words, and various sums which may be derived from different fields within the associatively selected words. The extent and complexity of such computations, and the utility and speed of such computations will be further elaborated below after the descriptions of specific embodiments of the invention.

Other objects and advantages and features of the invention, and a complete understanding thereof will be apparent from the following specification and the accompanying drawing as follows.

Figure 8:
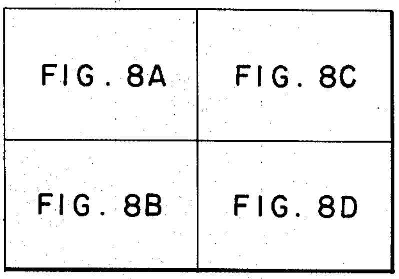
Figure 4:
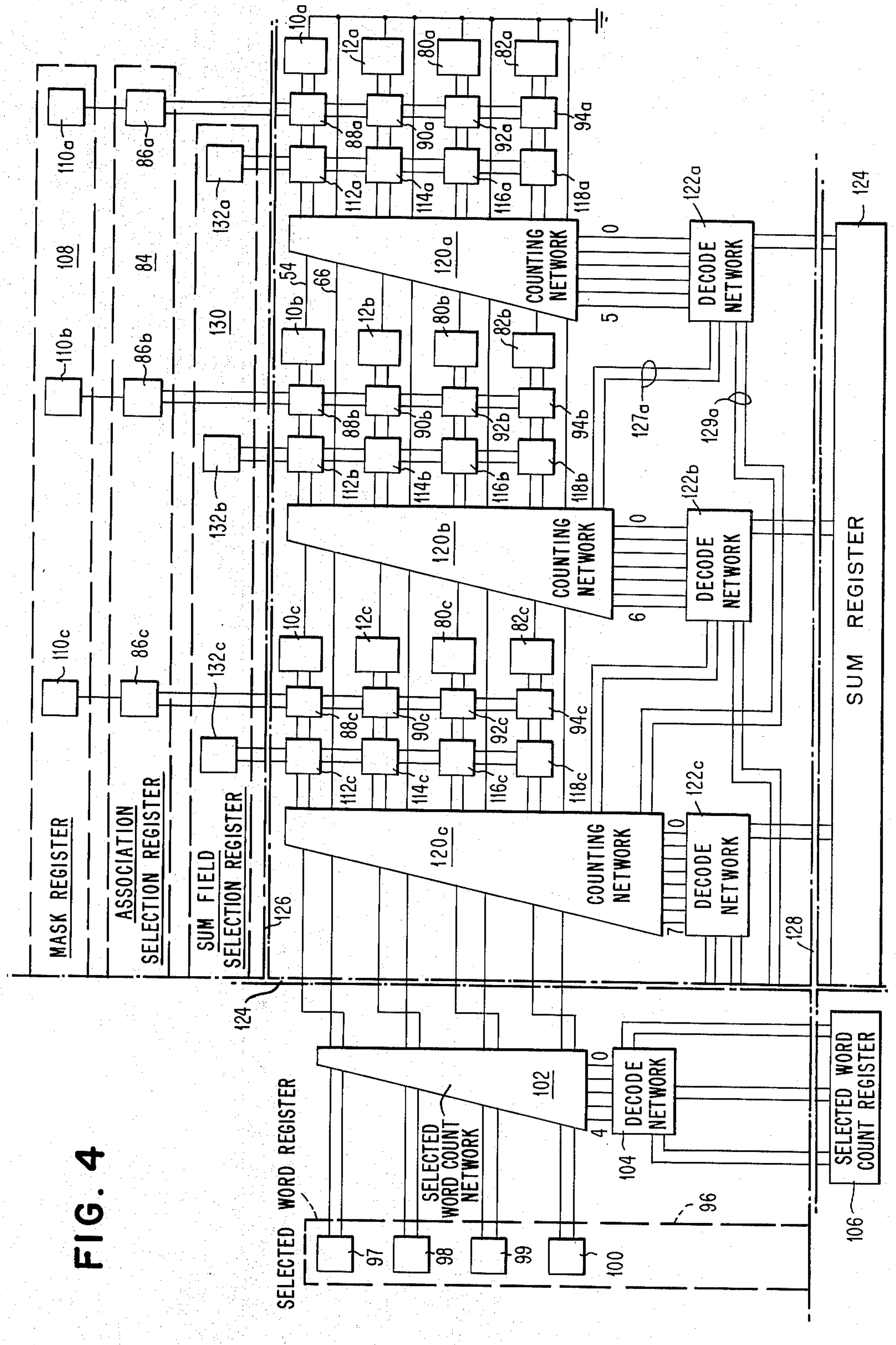
FIGURE 4 is a schematic representation of an associative calculating memory in accordance with the present invention showing an illustrative portion of the memory which is capable of storing three characters of each of four words.
Figure 7:
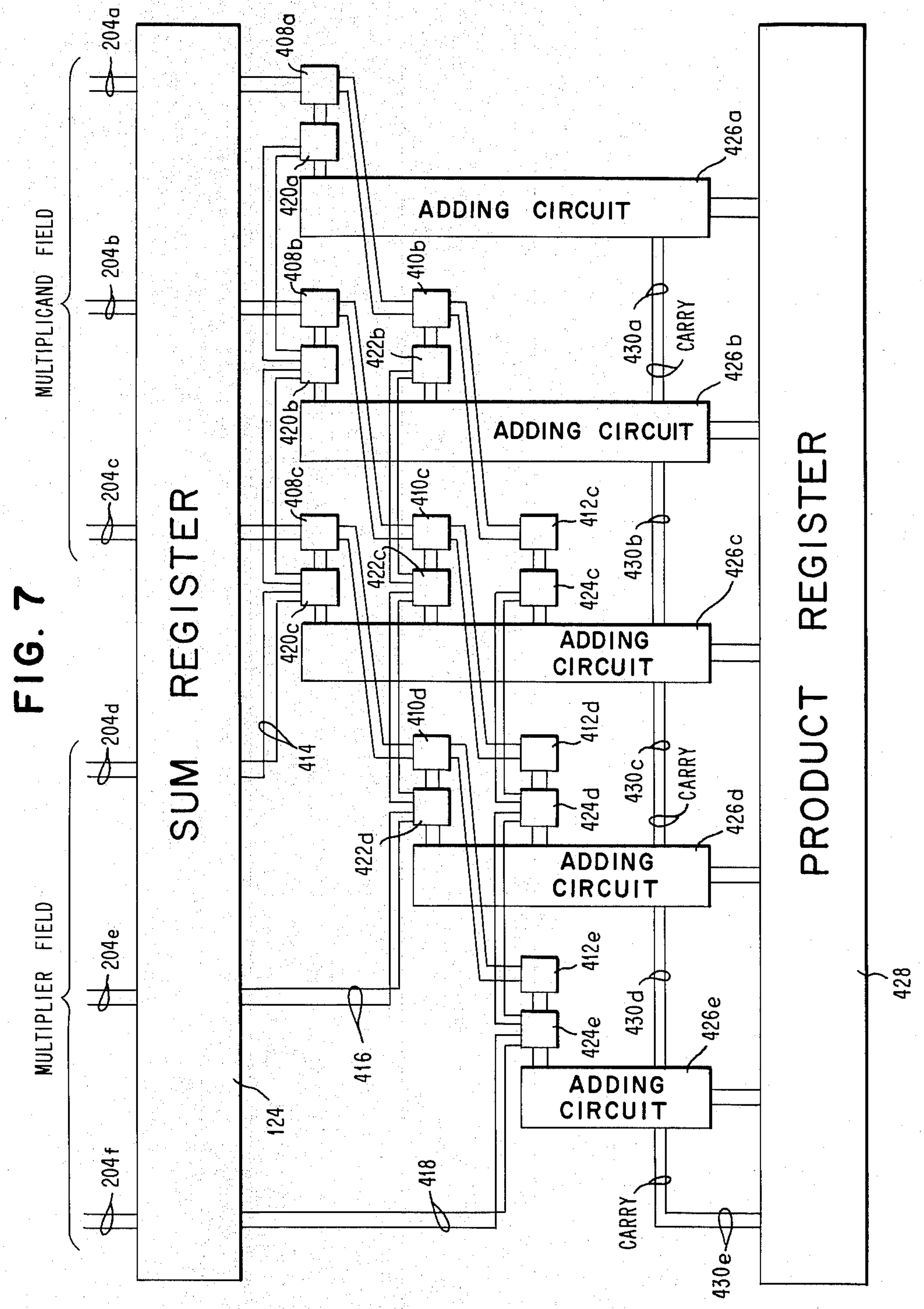

FIGURE 7 is a schematic diagram illustrating apparatus which may be incorporated with the system of FIGURE 4 in order to expand the system of FIGURE 4 for the purpose of rapidly obtaining a product of sums derived by summing two fields of all of the words selected from memory on an associative basis; and FIGURE 8 is a diagram incorporating FIGURES 8*a* through 8*d* illustrating how the invention may be embodied in circuits employing relays.

Referring again to FIGURE 1, there is shown a cryogenic embodiment of the memory system including cryogenic storage cells 10*a*, 10*b*, 12*a*, and 12*b*. Cells 10*a* and 10*b* may be said to be arranged in a row to form a two character word and cells 12*a* and 12*b* may be said to be arranged in a second row to form a second character word. Similarly, cells 10*a* and 12*a* may be said to be arranged to form a column. It will be understood that while only two rows and two columns are illustrated, it is intended that the system may be expanded to accommodate words of any desired size and to accommodate any desired number of words.

Figure 1:
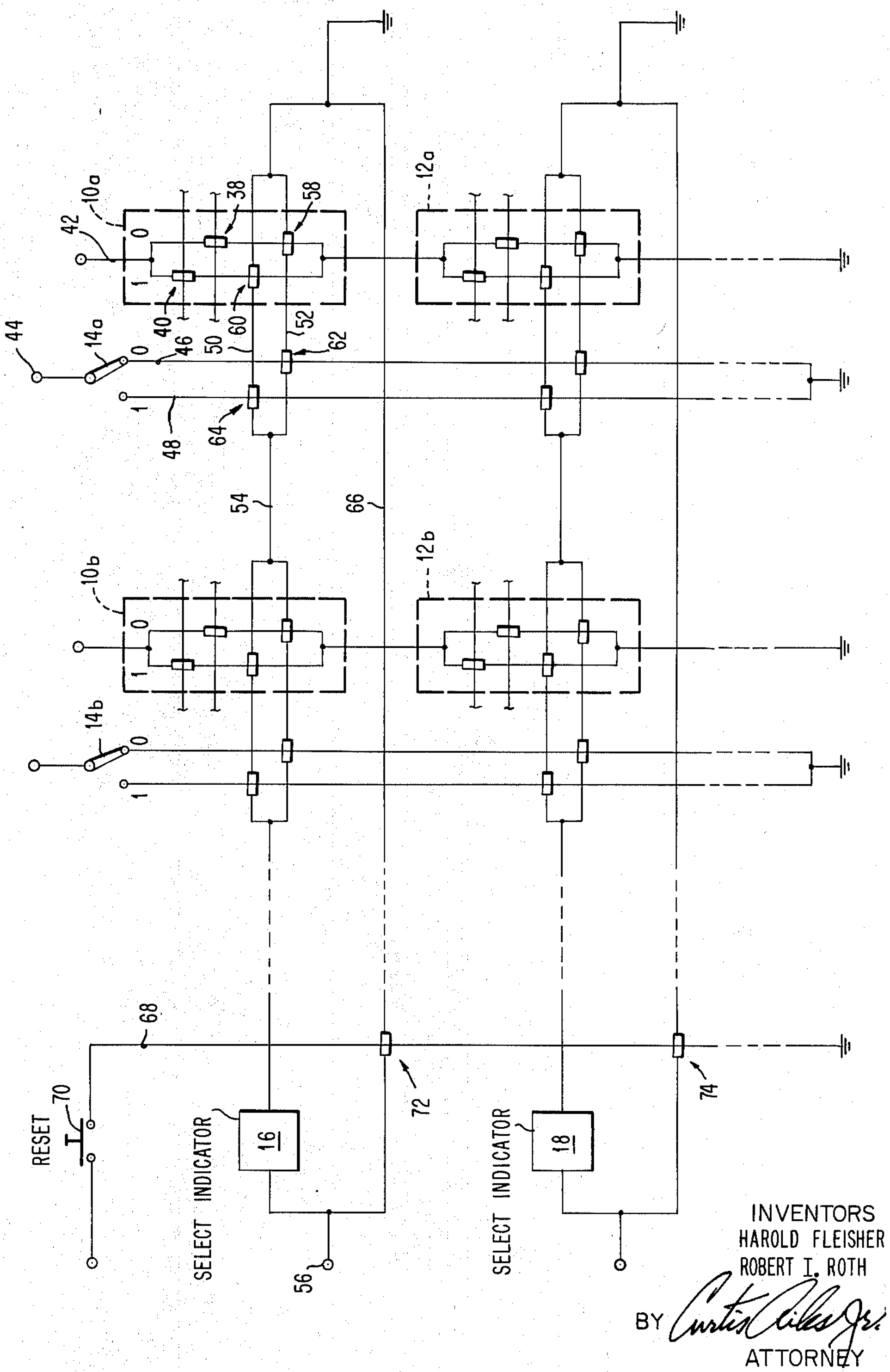
FIGURE 1 is a schematic representation illustrating a preferred form of associative memory in accordance with the present invention which is embodied in cryogenic circuitry.

The system of FIGURE 1 includes association selection apparatus for selecting all of the words in the memory which meet an association test and for indicating such selection. The values of the characters of the association word are supplied through apparatus schematically indicated by double throw switches 14*a* and 14*b*, one position of each switch indicating a binary 0, and the other position indicating a binary 1. If the data within the storage cells 10*a* and 10*b* corresponds with the association data indicated by the settings of switches 14*a* and 14*b*, then the association is met and the selection of the first word is indicated by a select indicator schematically shown at 16. Similarly, if the second word is selected, this is indicated at the indicator 18. The circuitry shown between the association data switches 14*a* and 14*b* and the select indicators 16 and 18 accomplish the association test concurrently on both the first and second words. Before proceeding to a more detailed description of the system of FIGURE 1, a description of the cryotrons and the cryotron circuit notation employed in FIGURE 1 is given below.

The term "cryotron" as used in the description of certain embodiments of the present invention refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to lose at least some of its superconductive properties so that the gate conductor becomes resistive.

Figure 2:
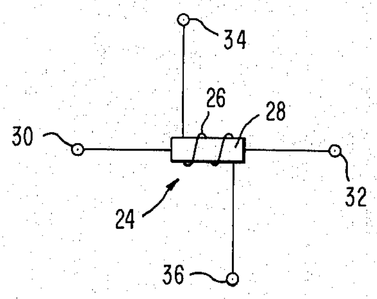
FIGURE 2 illustrates, in schematic form, a cryotron, a four terminal device which is useful in the construction of physical embodiments of the present invention.

FIGURE 2 illustrates such a cryotron device 24 having a control winding 26 around a gate element 28. The current to be gated or controlled flows through the gate element 28 between terminals 30 and 32, while the control current which causes such gating flows through the winding 26 between terminals 34 and 36.

Figure 3:
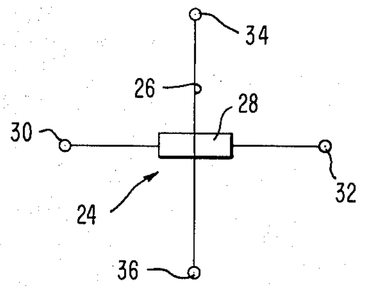
FIGURE 3 is a simplified representation of the cryotron of FIGURE 2 which is employed in FIGURE 1 and in subsequent figures relating to cryogenic embodiments of the present invention.

In FIGURE 3, the cryotron of FIGURE 2 is illustrated in a simplified form, the same reference numerals being employed to designate corresponding parts. It is to be seen that the only difference is that the winding 26 is represented in FIGURE 3 simply by a conductor disposed across gate element 28. This simplified representation of a cryotron is employed in all of the remaining figures showing cryogenic embodiments of the present invention. In these systems, the circuit lines or wires and the control conductor or winding 26 of each cryotron may be composed of a so-called "hard" superconductor material such as niobium or lead. On the other hand, the gate element 28 of each cryotron is composed of a "soft" superconductor material such as tantalum or tin, for instance. The current employed is such that the current in the control winding 26 creates a magnetic field which exceeds the critical field value to cause the gate to become resistive but the field does not exceed such a critical value with respect to the material of the control winding 26 and the interconnecting lines and wires, so that these elements remain substantially superconductive.

When two gate conductors are electrically connected in parallel, one being superconducting and the other being resistive, a current flowing to the parallel combination will flow entirely through the superconducting gate although the other gate may exhibit only a few tenths of an ohm resistance. Then, if the resistive gate is allowed to become superconducting, the current will continue to flow through the original superconducting gate. Thus, current is caused to flow through a selected path which is maintained superconducting and such current will continue to flow in that path even if other parallel paths later become superconducting.

It is to be understood that the cryotron devices may be constructed of thin films such as are shown and described in co-pending application Serial No. 625,512 filed November 30, 1956 by R. L. Garwin and entitled "Fast Cryotrons" and assigned to the same assignee as the present invention. Additional information on cryogenic superconductive gating devices and certain logical circuits which may be created with such devices is contained in an article by D. A. Buck entitled "The Cryotron—A Superconductive Computer Component" in Proceedings of the IRE, volume 44, No. 4, pages 482–493, April 1956.

FIGURE 1 is more completely described as follows: storage cells 10*a*, 10*b*, 12*a*, and 12*b* each consist basically of cryogenic alternate current loops or flip-flops in which current is carried in either one circuit branch or the other to store and indicate the binary digit "0" or the binary digit "1." As illustrated in the cell 10*a*, these branches include the gates of cryotrons 38 and 40. Information is written into the cell 10*a* by means of current which is applied either to the control winding of cryotron 38 to write in a "1," or to the control winding of cryotron 40 to write in a "0." When the control current is in the control winding of cryotron 38, the gate of cryotron 38 becomes resistive so that the current from an input connection indicated at 42 is caused to traverse the gate of cryotron 40 indicating a "1" value stored in the flip-flop. Conversely, with current in the control winding of cryotron 40, the current from 42 is forced to traverse the gate of cryotron 38 to indicate a "0" binary stored value. In order to simplify the system as shown in FIGURE 1, the circuits which supply the currents for the control windings of cryotrons 38 and 40, and the corresponding currents for each of the other storage cells are now shown.

As previously mentioned, an association comparison is to be made between the information stored in cell 10*a* and the information indicated by the position of the schematic switch 14*a*. A suitable current is supplied from a conventional current source at terminal 44 to pass vertically downward through switch 14*a* and either through the "0" line 46 or a "1" line 48. The information contained in storage cell 10*a* is compared with the information contained in the association bus lines 46 and 48 by means of a read out or association loop including conductors 50 and 52 which alternatively carry the current from a circuit 54 which is initially derived from a current input connection 56. The right branch of the 10*a* storage cell flip-flop includes the control winding of a cryotron 58 and the left branch includes the control winding of cryotron 60, and the gates of these cryotrons are respectively in the read out branch circuits 52 and 50. Similarly, association bus circuits 46 and 48 include control windings of the cryotrons 62 and 64 whose gates are in the read out circuits.

If a "0" is stored in cell 10*a*, signified by a current through the "0" branch including the control winding of cryotron 58, then cryotron 58 is resistive and the current from connection 54 is caused to pass through read out branch 50. If the association digit indicated by switch 14*a* is also "0" so that current from input 44 traverses the control winding of cryotron 62, then cryotron 62 is also resistive and there is no change in the result that current from connection 54 traverses read out branch 50. However, if switch 14*a* is reversed, indicating an association digit of "1" by a current through association bus conductor 48 traversing the control winding of cryotron 64, then read out branch circuit 50 also becomes resistive. The current originating at input terminal 56 is then forced into a non-match branch circuit conductor 66 and it does not traverse either of the read out conductors 50 or 52. It will be apparent that the same result is achieved for the other non-matching condition where switch 14*a* is set on "0" to make cryotron 62 resistive and where cell 10*a* is storing a "1" such that cryotron 60 is resistive. It is apparent also that if both quantities are binary "1," such that cryotrons 60 and 64 are both resistive, than the current from circuit 54 will traverse branch 52, as a match condition is again indicated.

The circuitry for other digit positions of the first word operate in precisely the same manner as just described in connection with storage cell 10*a*. It is apparent therefore that no matter how many character positions there may be for a single word, a mis-match in any of those character positions causes a shift of the current of source 56 from the match circuit branch, such as 54, to the mis-match circuit 66. For each word, association selection indicators such as 16 and 18 are provided for actuation by the association circuit corresponding to 54, to indicate the association condition whenever that condition exists. These indicators are active whenever traversed by a current, and inactive when not traversed by a current. Indicator 16 and 18 may be lamps or other indicator devices of conventional construction, with suitable amplifiers if required.

Whenever a new association operation is to be performed, the switches 14*a*, 14*b*, etc. are appropriately set and a reset circuit 68 is energized. This is schematically indicated by a reset button at 70. The reset current in circuit 68 traverses control windings of appropriate cryotrons as indicated at 72 and 74 causing the non-match circuits such as 66 to become resistive to force the current from sources such as 56 back into the match circuit 54. In practice, the matching test currents from switches 14*a* and 14*b* may be applied after the resetting of the non-match current from circuit 66 into the match circuit 54. After the matching operation is performed, the matching or association information provided at the indicators such as 16 and 18 may be used, if desired, in various ways such as to control suitable read out apparatus (not shown in this figure).

FIGURE 4 shows, in a schematic block diagram form, a version of the system of the present invention which is more complete than that of FIGURE 1. It shows features in addition to those of FIGURE 1, including circuitry for reading out the selected words which match the association input data. A detailed cryogenic embodiment of the system of FIGURE 4 is shown in FIGURE 5, which incorporates FIGURES 5*a* through 5*h*.

Figure 5:
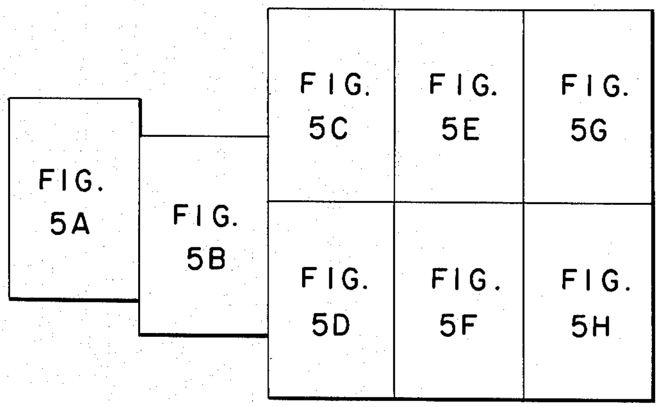
FIGURE 5 is a diagram incorporating FIGURES 5A through 5H and showing the manner of interconnection of those figures to form a schematic diagram of a cryogenic embodiment of the system illustrated in FIGURE 4.

The embodiment of the present invention disclosed in FIGURES 4 and 5 has many features which are common to the system disclosed and claimed in our co-pending patent application, Serial No. 79,823 for a "Calculating Memory" filed on December 30, 1960 and assigned to the same assignee as the present invention (docket 10,322). In the system of FIGURE 4, the individual character storage cells are shown for the first word at 10*a*, 10*b*, and 10*c*. Corresponding cells for the second word are shown at 12*a*, 12*b*, and 12*c*. And such cells for the third and fourth words are shown at 80*a*, 80*b* and 80*c* and at 82*a*, 82*b*, and 82*c*. The association data are supplied from an association selection register 84 having individual association data character flip-flops, 86*a*, 86*b*, and 86*c*. The individual character comparison circuitry for the first word is shown at 88*a*, 88*b*, and 88*c*, for the second word at 90*a*, *b*, and *c* and for the third and fourth words at 92 and 94*a*, *b*, and *c*. The storage flip-flops 10, 12, 80, and 82*a*, *b* and *c* each may be of identical construction to flip-flop 10*a* in FIGURE 1 and the comparison circuitry 88 through 94*a*, *b*, and *c* may be similar to that described in FIGURE 1 in connection with cryotrons 62 and 64.

In the embodiment of FIGURE 4, the word selection indicators corresponding to indicators 16 and 18 in FIGURE 1 are embodied in a selected word register 96 having individual word selection indicators 97 through 100.

One additional feature of the system of FIGURE 4 is in the provision of a selected word count network 102 which is capable of providing an output signal on one of a plurality of output conductors which is indicative of the number of words which have been associatively selected. This output signal is supplied to a decode network 104 which is capable of converting the count into a binary number representation which is supplied from network 104 to a selected word count register 106. These components may be referred to collectively hereinafter as a "selected word count adder."

The signals directed to the comparison circuits such as 88*a*, *b*, and *c* from the association selection register 84 are supplied under the control of a mask register 108 having individual digit control elements 110*a*, *b* and *c*. When an association selection comparison is to be made in any particular order, then a current is emitted from the mask register digit unit corresponding to that order and the information stored in the corresponding association selection register flip-flop is supplied to the comparison circuitry. However, if no comparison is to be made in that particular order, then no current is supplied to the corresponding association data flip-flop, and no comparison takes place in that order. When no comparison takes place in a particular order, then a word will not be rejected because of lack of correspondence of the digit in that order with the association word digit. As a specific example, for instance, if no comparison is to be made in the lowest order, then the mask register digit unit 110*a* does not provide any current to association data flip-flop 86*a* and no comparison takes place in any of the compare circuits 88*a* to 94*a*. If, at the same time, a comparison is to be made in the second order, then a current is supplied from mask register digit unit **110*b* to association flip-flop 86*b* and a comparison does take place in the compare circuits 88*b* through 94*b*. As explained previously in connection with FIGURE 1, when a comparison is made between the association selection register and the contents of memory, if any digit position in which a comparison is made does not match the corresponding digit of the association selection register, the read out and association current is switched from a circuit 54 to a mismatch or non-select circuit 66** as indicated for the first word position.

In the embodiment of FIGURE 4, the read-out circuits from the individual storage cells not only provide for comparison and associative selection, but if the word matches and a selection is made, the information is transmitted on through select-suppress units, as indicated at 112 through **118*a***, *b*, and *c*, to counting networks **120*a*, 120*b*, and 120*c*. These counting networks are capable of providing a count of all of the "1" digits of all of the associatively selected words in each of the respective orders. These count values are indicated in terms of a signal on one of a plurality of output lines shown at the bottom of each network. Each of these networks 120*a*, 120*b*, and 120*c* supplies such output signal to a respective decode network indicated at 122*a*, 122*b*, and 122*c*. Each of the decode networks 122 is capable of transforming the count obtained from the associated counting network into a binary representation including a sum digit which is stored in the sum register 124, a second order carry digit represented in binary notation as "10" which is delivered for counting to the next higher order counting network, and a third order carry digit represented in binary notation as "1 0 0" which is sent to the second higher order counting network. For instance, in the first order, the first order carry from decode network 122*a* to the counting network 120*b* is indicated at 127*a* and the second order carry from decode network 122*a* to counting network 120*c* is shown at 129*a***.

A sum field selection register 130 is provided which includes individual digit control flip-flops **132*a***, *b*, and *c*. These individual sum field selection register control flip-flops may be set either to select or suppress the reading out and the counting of any "1's" from all selected words within the particular associated column. For instance, if flip-flop **132*a* is set on suppress, all of the first order column select-suppress units 112*a* through 118*a* are set on suppress and no "1's" will be carried into the counting network 120*a***, even though such "1's" may appear in a selected word.

As indicated by the vertical break lines at 124, the system of FIGURE 4 is generally intended to be much wider than the width shown. In other words, it is generally intended that a much higher number of orders is provided for accommodating words having many more than the three digits shown. For this purpose, the structure for the higher orders corresponds to counting network **120*c*, decode networks 122*c*, and the associated components. These structures are repeated as many times as necessary to provide the desired word size. The mask register 108, the association selection register 84, the sum-field selection register 130, and the sum register 124 are likewise correspondingly expanded to the left to provide for the required additional digit positions. Similarly, the break lines indicated at 126 and 128 are for the purpose of indicating that it is intended that the memory is generally to be expanded in size in a vertical direction to accommodate a larger number of words. For this purpose, the entire structure appearing between the break lines 126 and 128 is simply repeated as many times as is necessary to provide the desired word storage, each repetition of the structure providing an additional four words of capacity. In such an expansion, the output of the decode network, such as 122*a*, to the sum register 124, is fed instead to the next lower counting network corresponding to the counting network 120*a*. The count from upper sections is thus preserved and included in the count from lower sections of the system. In such an expanded system, additional counting and decode networks are required in the higher orders to accommodate for the additional propagation of carries. Additions of this nature are also required in the expansion of the selected word count adder including network 102 and the decode network 104. With such a vertical expansion of the system, the selected word register 96** is also expanded in size to provide additional word selection indicators for each added word. While a four word recombination section is illustrated, it is understood that other section sizes may be employed. For instance, a section which counts up to fifteen binary "ones" would require a third order carry, and each added section would take care of eleven additional words.

It will be apparent from the above explanations of the system of FIGURE 4 that any desired word may be placed in the association selection register and any combination of digits from the association selection register may be used for the association selection operation under the control of the mask register 108. The system may then be caused to immediately form the sum of any desired field of the selected words, and that sum appears in the sum register 124. The field in which the sum is taken, as determined by the sum field selection register 130, need not bear any relation to the field upon which the association is made, as determined by the contents of the mask register 108.

A typical use of the system is for the storage of payroll information. This may include information such as is commonly placed by factory workers on job tickets indicating, among other items, the amount of time worked on particular projects and including the man number of the individual man. With the present system, all of the information from each job ticket may be placed in a single word, one field containing the man number and another field containing the hours worked. It is then possible to make an associative selection on the field containing the man number and to thus select all words containing information about a particular man. The sum field selection register can then be set to cause the formation of a sum for the field of each word containing the "hours worked" information. The system is thus capable of rapidly associatively selecting all of the job ticket information words for a particular man, and of immediately forming the total sum of hours worked by that one man, in sum register 124. Other typical applications of the system of this invention will be discussed more fully below.

Certain features of the embodiment of the system of FIGURE 4, and particularly the counting and decode networks such as **120*a* and 122*a*, and the associated select-suppress units 112*a* through 118*a***, form a part of the subject matter disclosed and claimed in our co-pending patent application Serial Number 79,823 previously mentioned above.

FIGURE 5 incorporates FIGURES 5A through 5H and shows how FIGURES 5A through 5H are combined. They show how the system of FIGURE 4 may be embodied in specific circuitry employing cryogenic switching elements. FIGURES 5A through 5H may be collectively referred to below as FIGURE 5.

In FIGURE 5 all of the parts corresponding to those shown in FIGURE 4 are given the same numerical designations. The individual data storage cells **10*a***, *b*, and *c*; **12*a***, *b*, and *c*; **82*a***, *b*, and *c*; and **84*a***, *b*, and *c* are constructed exactly as previously described in connection with storage cell **10*a* in FIGURE 1. Furthermore, the read out of information from the storage cells and the association comparison operation are carried out exactly as previously described in connection with FIGURE 1. Thus, if the stored bit in cell 10*a* is "0" as signified by a current through the gate of cryotron 38, and the association data bit is also "0" as signified by a current in line 46, the association circuit cryotrons 58 and 62 are both resistive and the gates of cryotrons 60 and 64 are both open. Conversely, if both values are "1," the gates of cryotrons 60 and 64 are both resistive and the gates of cryotrons 58 and 62 are both open so that an association condition of this particular digit is again recognized. However, if there is a mismatch condition, either the gates of cryotrons 64 and 58 will both be resistive, or the gates of cryotrons 60 and 62 will both be resistive. In either of these latter cases, both of the two matching branches 50 and 52 will be resistive so that current is shifted into the mismatch line 66** to indicate a mismatch condition for the entire word.

As explained in connection with FIGURE 4, the association selection register 84 contains storage cells or flip-flops 86*a*, *b*, and *c* for the storage of the association word. As indicated in cell 86*a*, these cells each include a basic cryogenic current flip-flop including the gates of cryotrons 134*a* and 136*a*, and a read out loop including the gates of cryotrons 138*a* and 140*a*. The association information currents are selectively provided on lines 46 and 48 through the gates of cryotrons 142*a* and 144*a*. The binary information stored in the basic storage loop, in terms of a current either through the gate of cryotron 134*a*, or 136*a*, may be read out through control of cryotrons 138*a* and 140*a*, and if any current is supplied through the connection indicated at 146*a*, then association information is provided on either line 48 or 46 by control of the cryotrons 142*a* and 144*a*. In particular if a zero is stored, as signified by a current through the gate of cryotron 136*a*, then a zero will be read out as signified by a current through the gate of cryotron 138*a*, and a zero association current will be supplied through the gate of cryotron 144*a* on line 46. If the association operation is not to be performed in the first order, then no current is supplied on line 146*a*, and since there will then be no current on either of lines 46 or 48, neither of the cryotrons 62 or 64 can be made resistive and no mismatch can be indicated in any of the first order digit positions in memory.

The supplying of a current on connection 146*a* is under the control of the mask register 108 and particularly the mask register storage cell 110*a* which similarly includes a basic cryogenic information storage loop including the gates of cryotrons 148*a* and 150*a*, a read out loop including the gates of cryotrons 152*a* and 154*a* and a cryotron flip-flop controlled by the read out loop including the gates of cryotrons 156*a* and 158*a*. If a binary "one" is stored in the basic storage loop flip-flop, it will be signified by a current through the circuit including the gate of cryotron 148*a*, and this will close the gate of cryotron 152*a* to cause the read out current to flow in the gate of cryotron 154*a* to control the gate of cryotron 158*a* to cause a current to flow through the gate of cryotron 156*a* to connection 146*a* to provide for an association operation in the first order. Conversely, a "zero" stored in the cell 110*a* results in the cryotron 156*a* being resistive, and the alternate current branch circuit through the gate of cryotron 158*a* to ground is effective so that no current appears on connection 146*a* and no association operation takes place. It is thus apparent that the mask register calls for an association operation in all digit orders where the mask register stores a "one" and it masks out, or calls for "no association" operation in all digital orders where the mask register stores a "zero." This masking control is independent of the binary digits stored in the association register 84.

For all words which are matched, or selected, on an associative basis, the read out currents remain in the read out information lines such as 50 and 52, and in the extended read-out circuit represented by line 54. For all such words, the binary digital values in each order are supplied through a select suppress unit to the counting network. For instance, in the first word position in the first order, such information is supplied through the select-suppress unit 112*a* to the counting network 120*a*. All such binary one values are counted in the counting network such as 120*a*, and a sum of all of the one bits of all of the associatively selected words is caused to be registered in the sum register 124. However, as previously explained in connection with FIGURE 4, the summation operation may be limited to individual fields represented by one or more selected columns under the control of the sum field selection register 130.

Like the association and mask registers described above, each digit position of register 130, such as 132*a* for the first order, includes a basic information storage flip-flop. In 132*a* this includes the gates of cryotrons 160*a* and 162*a* with a read out loop including the gates of cryotrons 164*a* and 166*a*, and a main output control circuit including the gates of cryotrons 168*a* and 170*a*. A "zero" stored in the cell 132*a* results in a read out suppress operation for suppressing the summation of "ones" stored in the associated column. This occurs as follows: A "zero" storage is represented by a current through the gate of cryotron 162*a* which closes the gate of cryotron 166*a* causing a current in the read out loop through the gate of cryotron 164*a* which closes the gate of cryotron 168*a* and causes the control current to traverse the gate of cryotron 170*a*. Conversely a "one" stored in unit 132*a* causes a current to be supplied through a select line including the gate of cryotron 168*a*.

The select and suppress operation takes place within the select-suppress unit such as 112*a* which consists of a suppress cryotron 172 and a select cryotron 174.

As previously mentioned, a current in the upper line 50 of the read out loop from the storage cell 10*a* indicates a read out of a "zero" value, and a current in the lower line 52 indicates a read out of a "one" value. If suppress operation is called for, the gate of cryotron 172 is closed by a current in its control winding, and any "one" value current on line 52 traversing the gate of cryotron 62 is caused to cross over through the gate of cryotron 174 to the "zero" line. However, if the select-suppress unit 112*a* is operated in the "select" mode, then the gate of cross-over cryotron 174 is closed so that there can be no crossover of a "one" value current to the "zero" line. Any "one" value current continues on the "one" line through gate 172 of the select-suppress unit. Since the counting circuits such as 120*a* are arranged to count "ones," the select-suppress units such as 112*a* need not modify any "zero" read out currents. Suppression of "ones" to "zeros" is sufficient. All the other select-suppress units 114*a* through 118*a*, and 112*b* and *c* through 118*b* and *c*, operate in a manner similar to that just described for unit 112*a*.

Each counting network, such as counting network 120*a* in the first order is capable of generating a count of the number of "ones" stored in the first four word positions in the associated order for all selected words. For reasons which will be explained more fully below, a current may enter the top of the network 120*a* either on line 176*a* to indicate a "zero" value, or on 178*a* to indicate a "one" value, before any count of the binary "one" digits in the four word positions shown takes place. If the current enters on the "zero" value line 176*a*, and if a binary "one" is read out of storage cell 10*a*, then a "one" value current which traverses the gate of suppress cryotron 172 will close the gate of a network cryotron 180 and force the current through an alternate branch circuit including the gates of associated cryotrons 182 and 184 to a "one" count signal line 186. However, if the value read out from character storage cell 10*a* is "zero," or if suppress operation is called for in the select-suppress unit 112*a* then the read-out current will appear at the control winding of cryotron 182 so as to force the current from connection 176*a* through the gate of cryotron 180 to maintain the count at a "zero" value as indicated by a current on line 188. In a similar manner, if the first word is a non-selected word, then the read out current which would otherwise appear on either lines 50 or 52 will be shifted into the non-word select line 66, as previously described in the association operation. In this event, current traverses the control winding of cryotron 184, which again forces the network current through the opposite branch including the gate of cryotron 180 to maintain the "zero" count value as indicated by the current on line 188. At the second word level, similar components are provided in the counting network 120a opposite digit storage cell 12a to raise the count value if the second word is associatively selected, and if a "one" is stored in storage cell 12a, and if the column is not suppressed. However, if a "zero" is stored, or if the column is suppressed, or if the word is not associatively selected, then the "one" count is maintained at its previous level with no increase. Thus, if the count value after the first word level is "zero," as indicated by a current on connection 188, and if no "ones" are to be counted at the second word level, then the current will appear at connection 190. However, if a "one" is counted at the second word level, then the current is shifted to the "one" count output line 192. The same line 192 receives the current if the count is "one" at the first word level, indicated by a current on line 186, and no "one" is counted at the second word level.

From the above, it is apparent that the network 120a is capable of generating a count of the total number of "ones" stored in the associated character storage positions, and this count is indicated by current on only one of the group of output lines indicated at 194a. Since this count is expressed in terms of a signal on only one of the six output lines, it may be referred to below as a unique signal condition on one of a plurality of lines, or as a "one-out-of-*n*" coded signal.

The "one-out-of-*n*" coded signal on connections 194a is converted to binary notation in the decode network 122a. In the first level, the decode network 122a includes cryotrons 195a through 200a for generating the first order sum digit. These cryotrons are arranged in alternate current branch circuits which obtain current from a current input point at 202a to generate a binary sum digit value on decode network output lines 204a. If the output from the counting network 120a, on connections 194a, is zero, two, or four, then the gate of one of the cryotrons 195a, 197a, or 199a is closed so that the current from 202a traverses the gates of cryotrons 200a, 198a, and 196a to provide the appropriate zero binary output on output pair 204a. On the other hand, if the count on connections 194a is one, three, or five, then the gate of one of the cryotrons 196a, 198a, and 200a is closed and the current from 202a then traverses the other branch including the gates of cryotrons 199a, 197a, and 195a to provide a binary one sum output on connections 204a. The connections 204a are of course directed to the sum register 124 where the first order sum is indicated at the control windings of cryotrons 206a through 212a for the purpose of reading out the information stored in this sum register.

In the second level of the decode network 122a, there are cryotrons 214a, 215a, and 216a. These cryotrons control a current in alternate current circuits from an input terminal indicated at 218a to provide a binary first order carry signal on output lines 127a. This carry signal is fed to the counting network 120b corresponding to network 120a in the second order of the system. A binary one in this carry circuit corresponds to a count of two. It will be seen that of the counting network output lines 194a, those indicating counts of two and three are joined below the cryotrons 197a and 198a so that either of these signal currents traverses the control winding of cryotron 215a to force the current from source 218a through the "one" carry value line of the output pair 127a, thus indicating a first order carry of "one." In a similar manner, a count of "zero" or "one" provides a control winding current at cryotron 214a and a count of "four" or "five" provides a control winding current on cryotron 216a. Either of these control currents results in forcing the current from source 218a through the gate of cryotron 215a to appropriately indicate a "zero" value for the first order carry.

At a third level in the decode network 122a, the circuits derived from the "zero" and "one" counts in output lines 194a are joined with the currents from the "two" and "three" counts to provide a single output connection 220a which forms the zero value output line for the second order carry in the output pair 129a. Similarly, the "four" and "five" combined signal line indicated at 222a forms the "one" value second order carry output. The binary second order carry output lines 220a and 222a, indicated as pair 129a, are connected into the second higher order counting network 120c to form a sixth counting level in that network. The counting networks 120b and 120c, in the second and third orders, are substantially identical to the counting network 120a except that additional counting levels are provided for the purpose of counting lower order carry digits. Also, the decode networks 122b and 122c are substantially identical to decode network 122a, both in construction and operation, with the exception that additional cryotrons are required in the first and second levels to accommodate for the higher count values.

The system shown in this FIGURE 5 is truly an abbreviation of a full system because more than three digits of storage for each word are almost invariably required, and higher orders are also required to accommodate for carries which go above the third order. As previously mentioned, this can be accomplished simply by repeating the apparatus shown in the third order. As mentioned above, the system of FIGURES 4 and 5 is intended to be expanded vertically to provide for the storage of additional words because systems in accordance with the present invention are almost invariably designed to store more than four words. As mentioned previously in connection with FIGURE 4, this expansion can be carried out by simply repeating the apparatus which appears between the break lines 126 and 128, including the counting and decode networks and associated circuitry. With this vertical repetition of system components, the binary sum output lines 204a from the decode network 122a for an upper section of the system feed into the two input lines for the counter network corresponding to network 120a in the next lower section. Thus, the sum output lines 204a of an upper section feed into the lines corresponding to 176a and 178a in the counting network corresponding 120a in a lower section. In the topmost counting network 120a, current is initially fed to the counter input line 176a, since no "ones" are counted above that level. In the second, and succeeding counting network section levels, a previous binary sum of "one" may be indicated at the point of current input by a current on the "one" line corresponding to 178a in network 120a. At the bottom of the system the sum register 124 is unchanged, with the individual digit storage circuitry as previously described, including the cryotrons 206a through 212a.

Figure 5A:
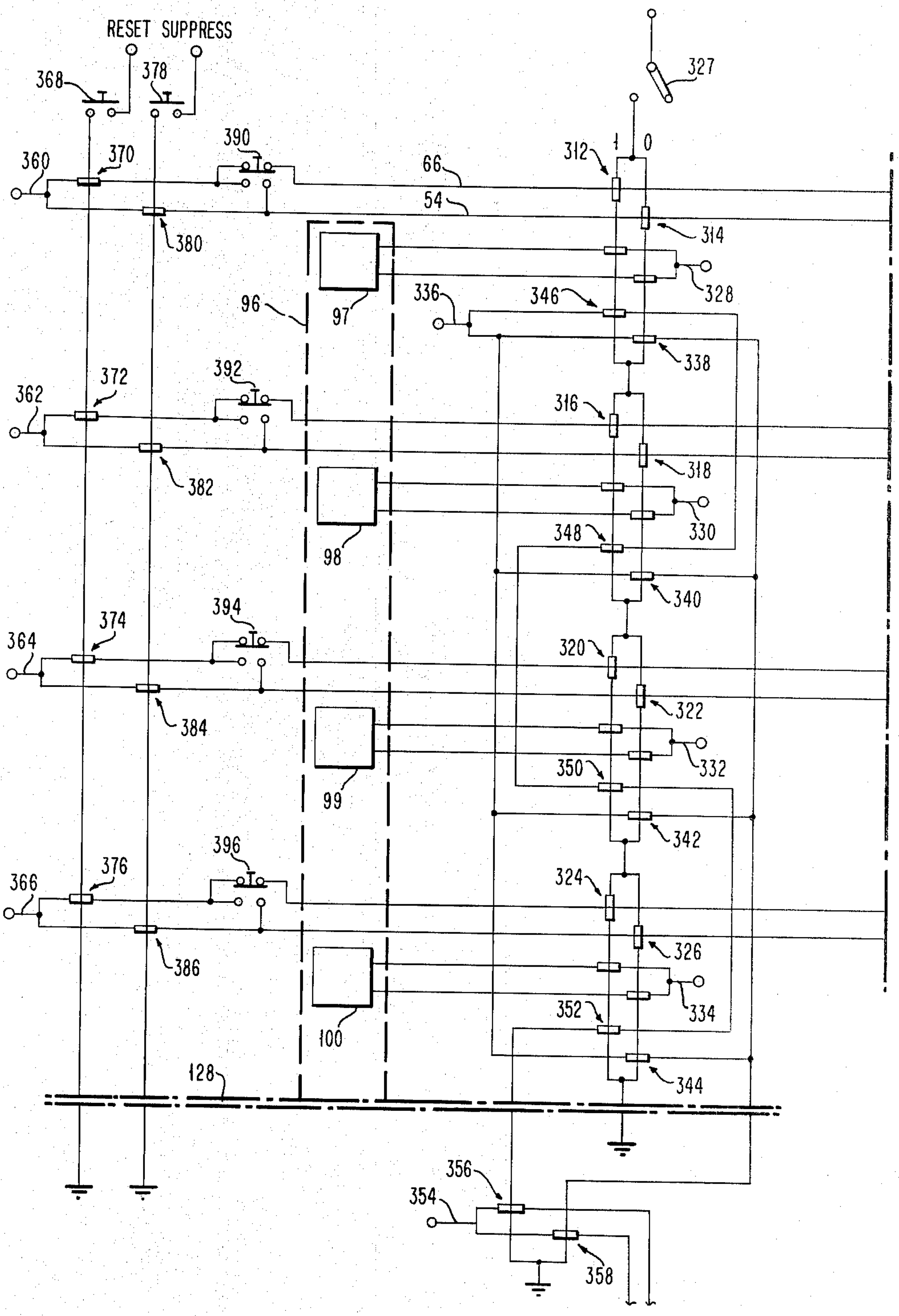
Figure 5B:
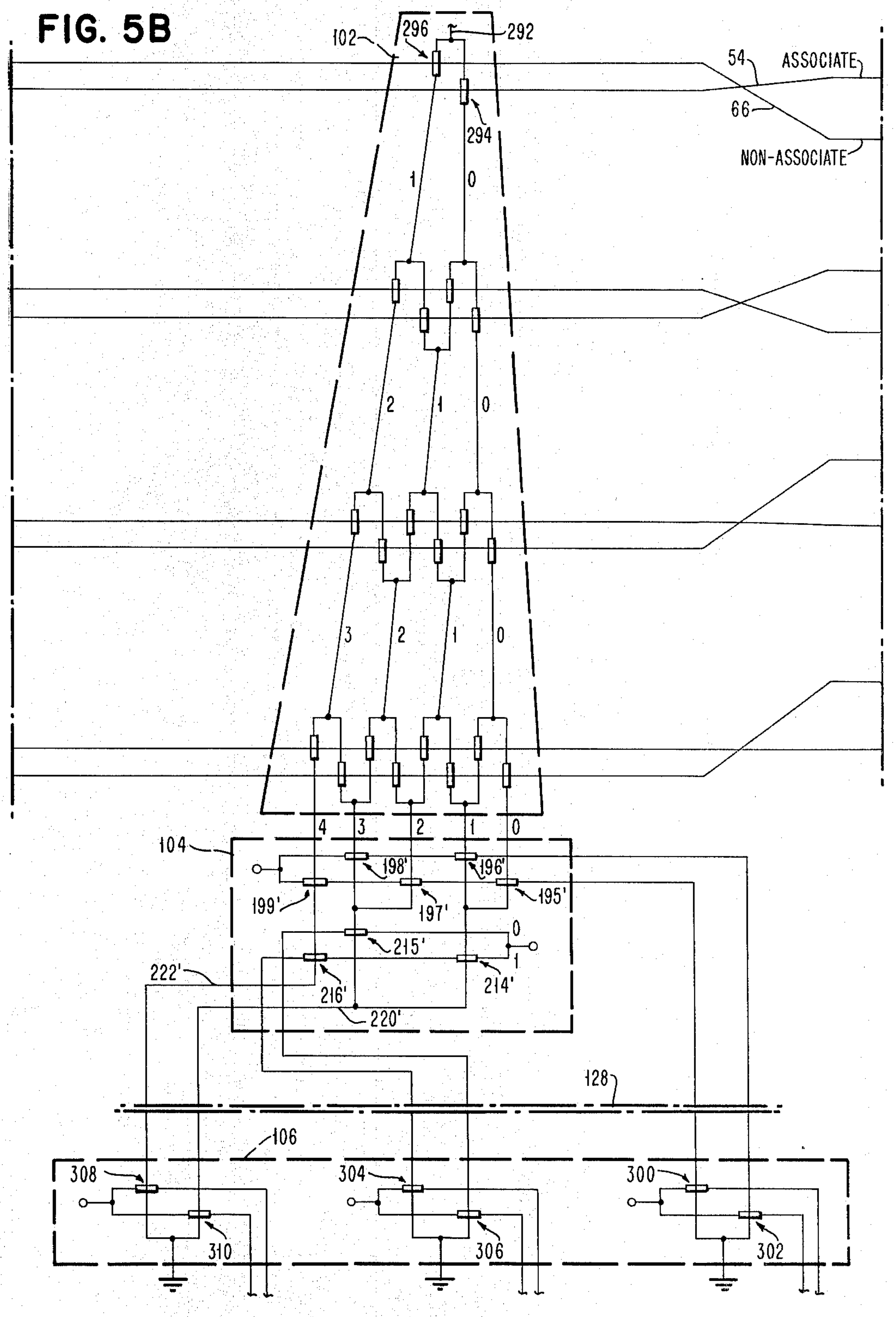
Figure 5C:
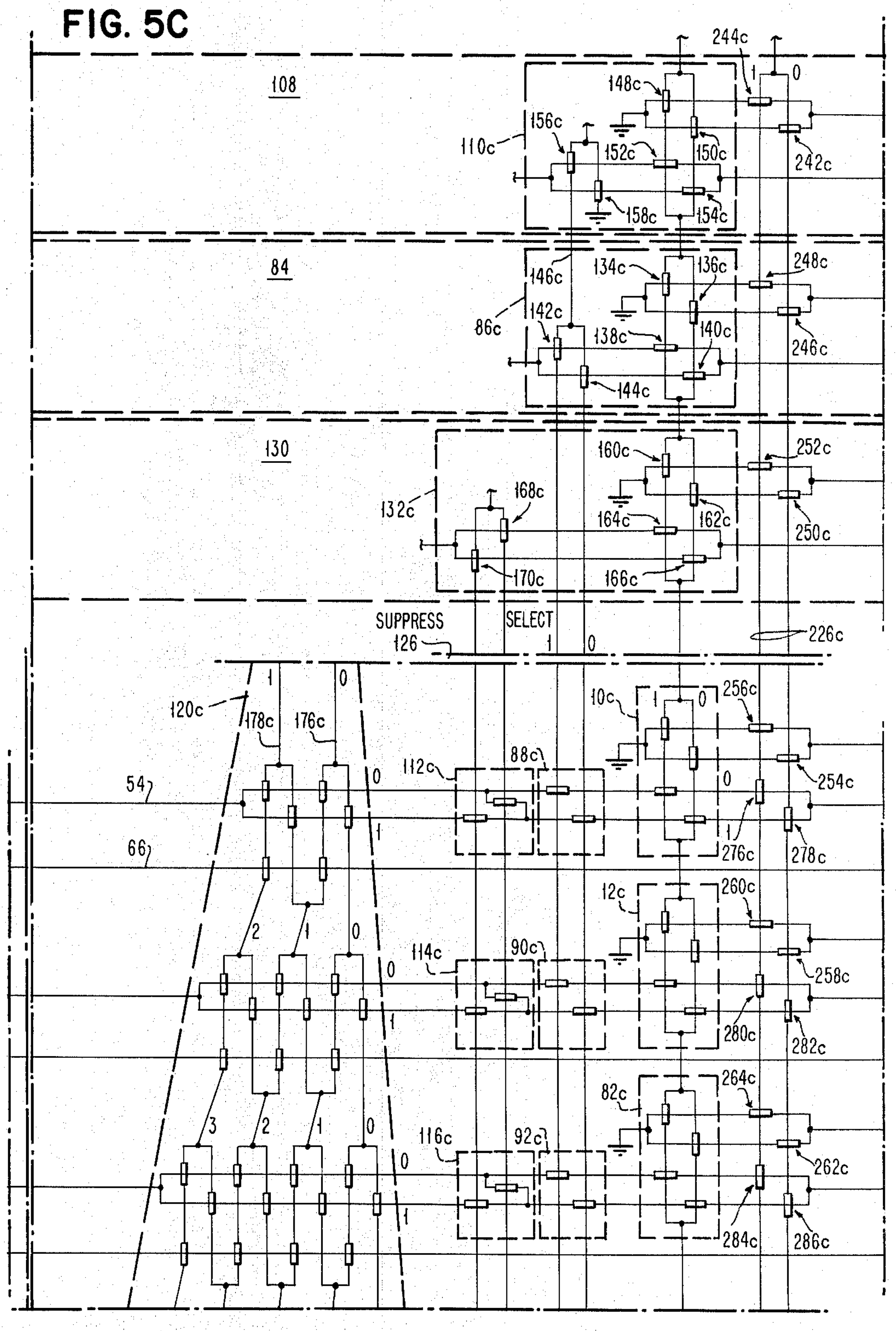
Figure 5D:
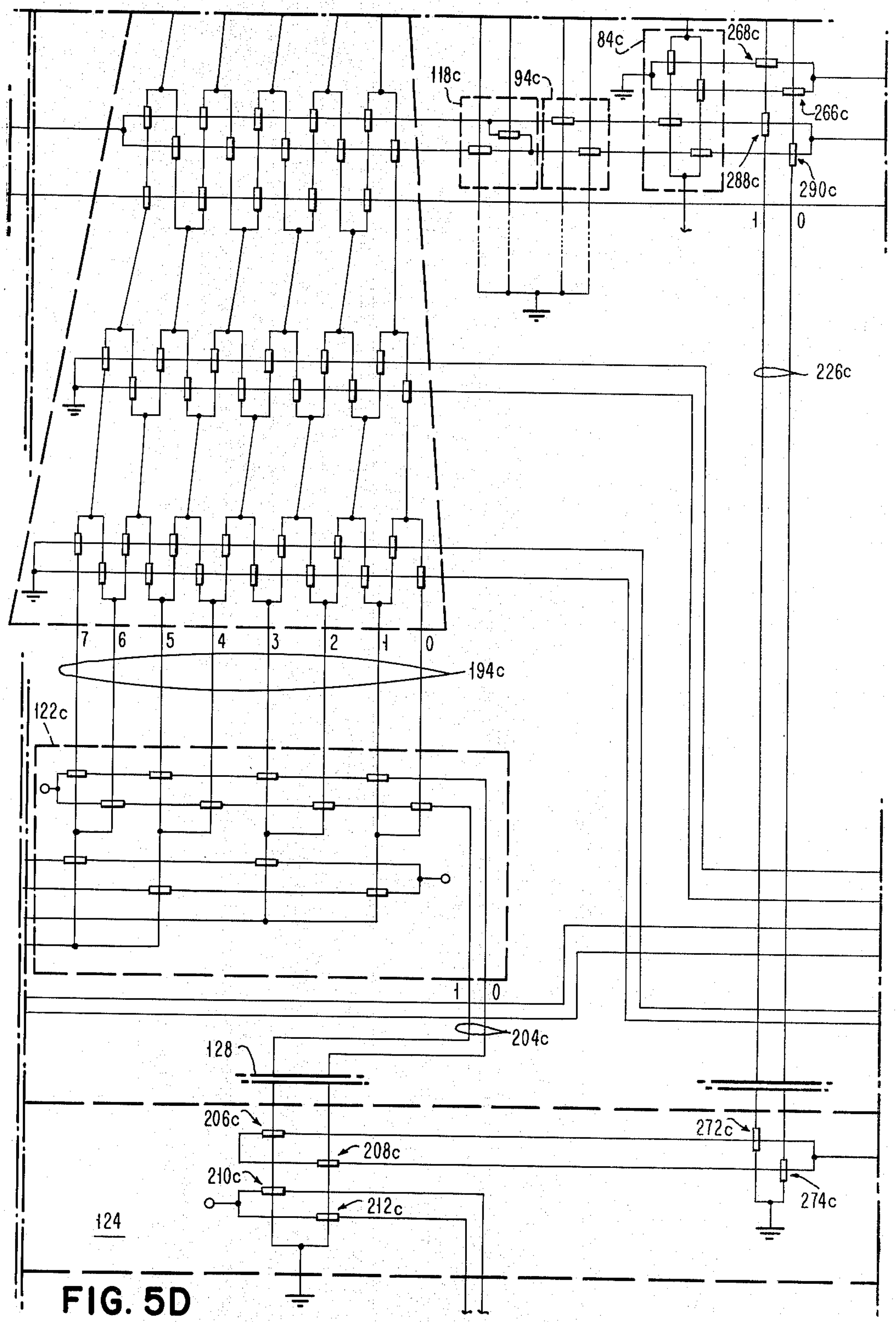
Figure 5E:
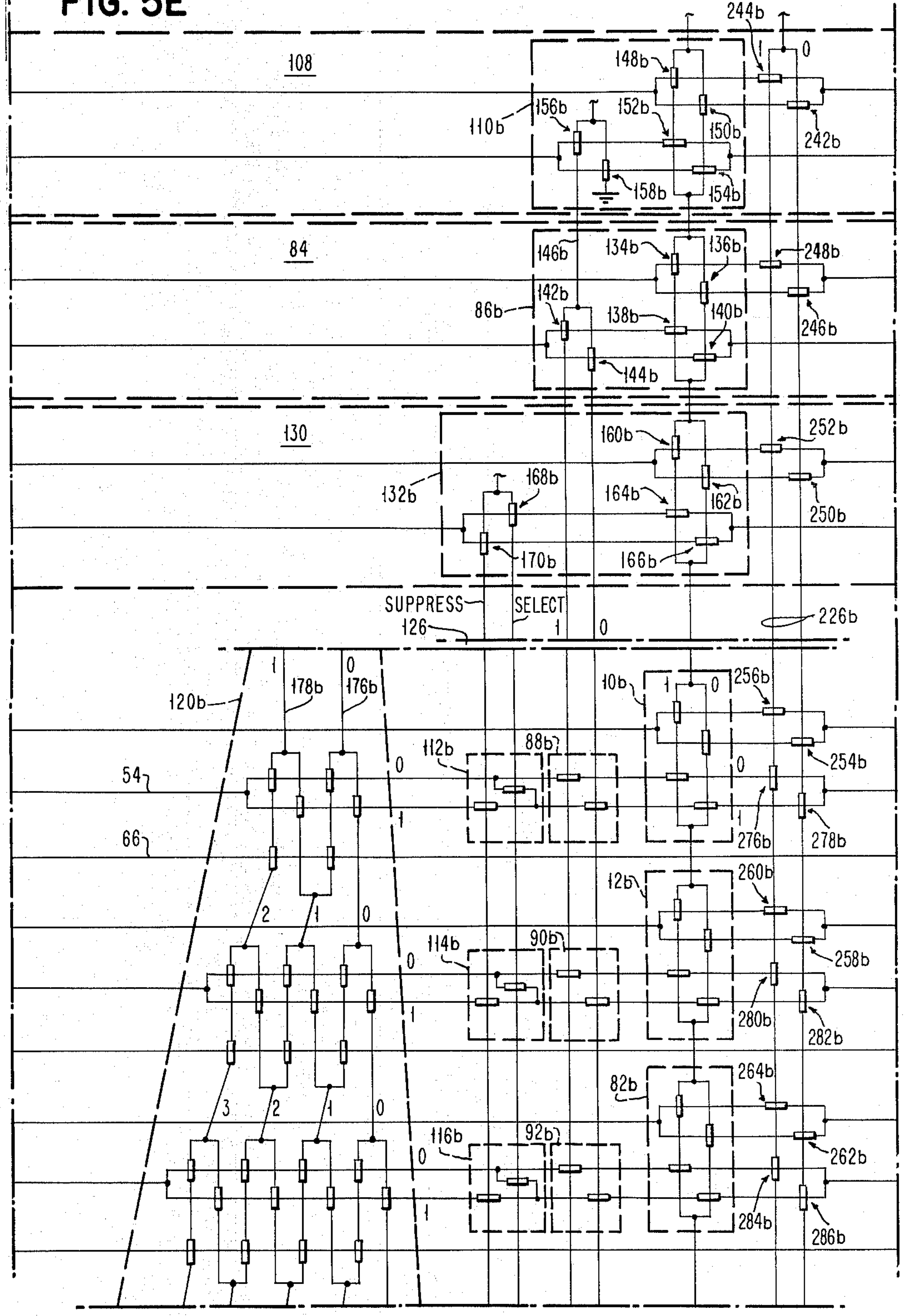
Figure 5F:
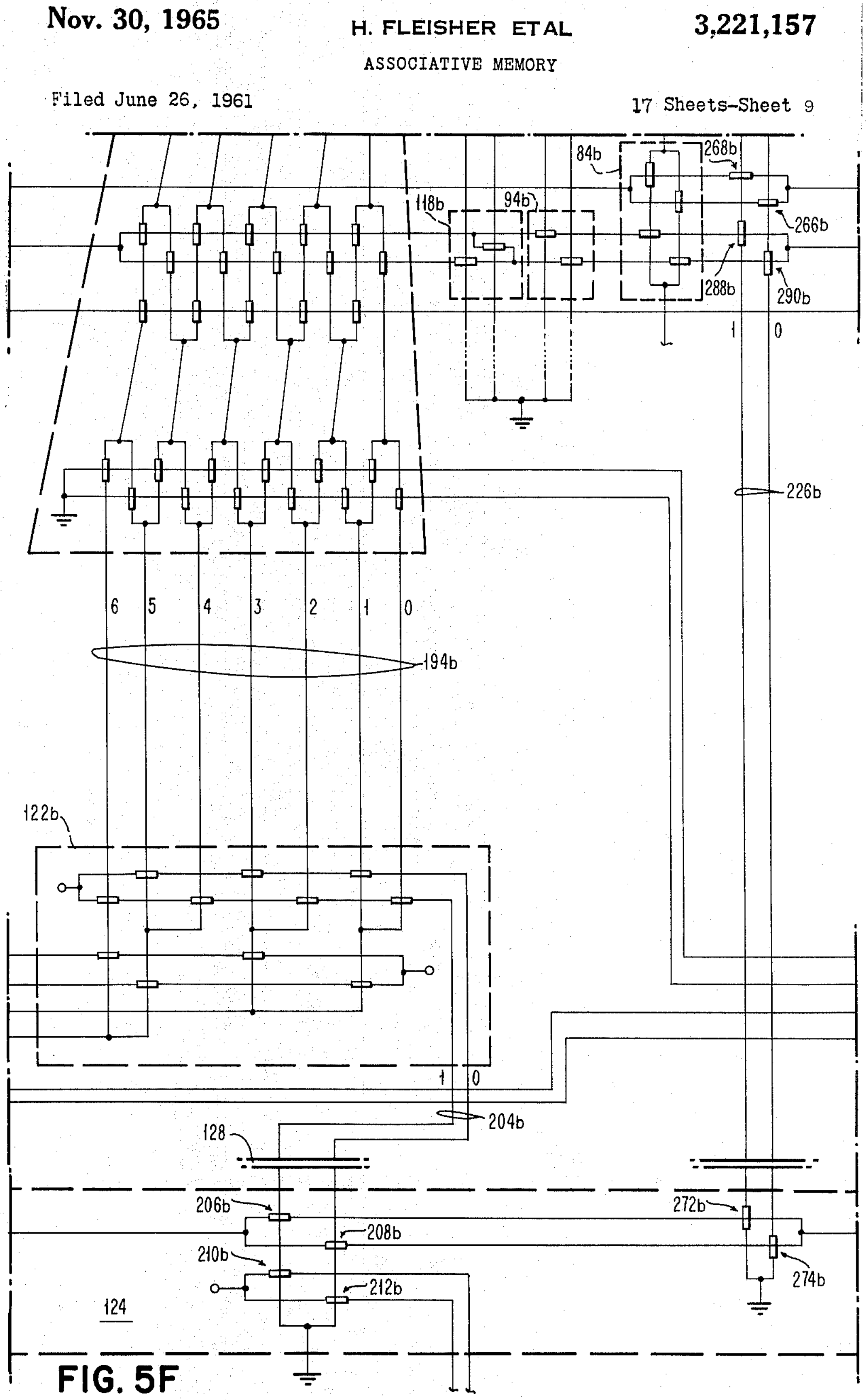
Figure 5G:
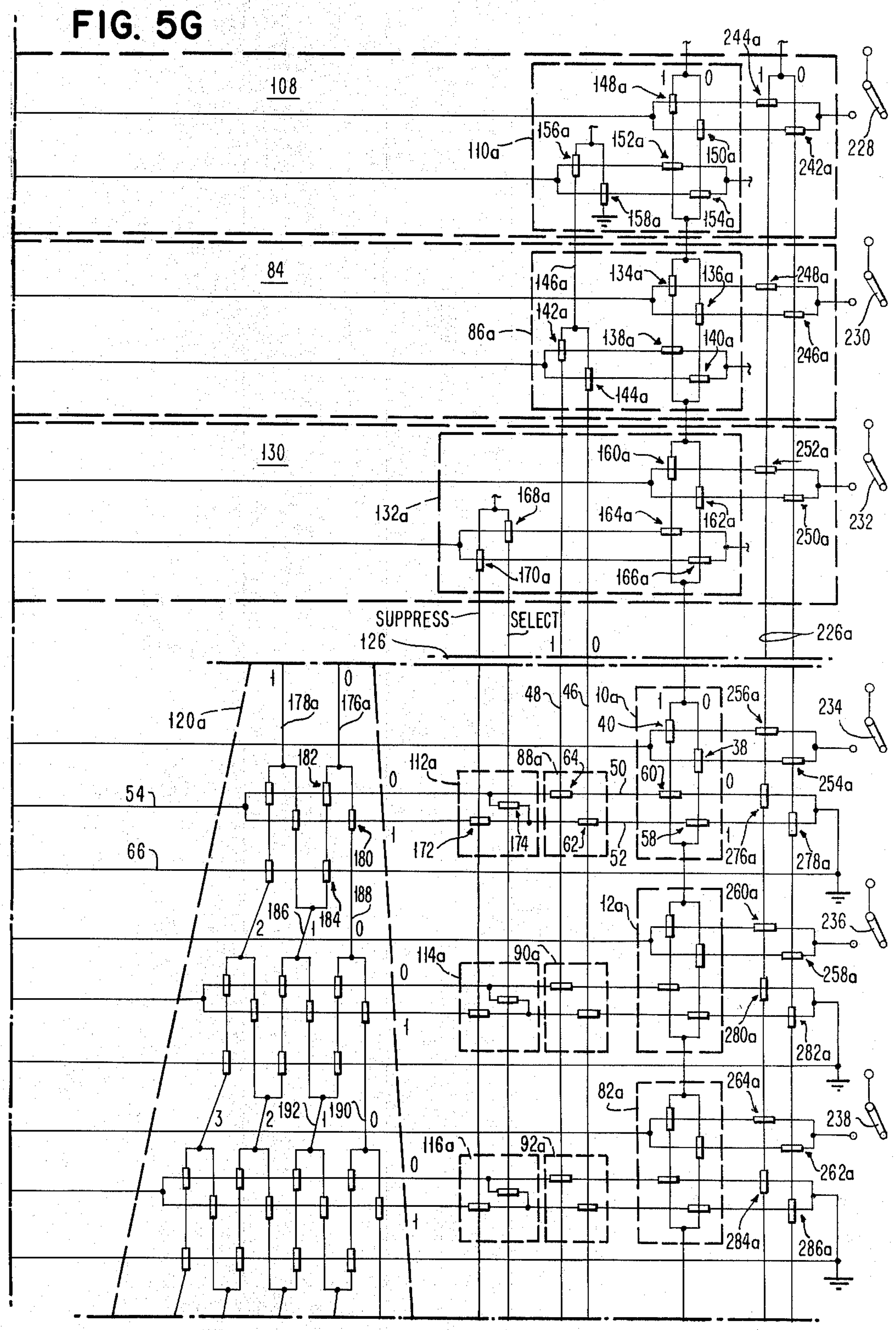
Figure 5H:
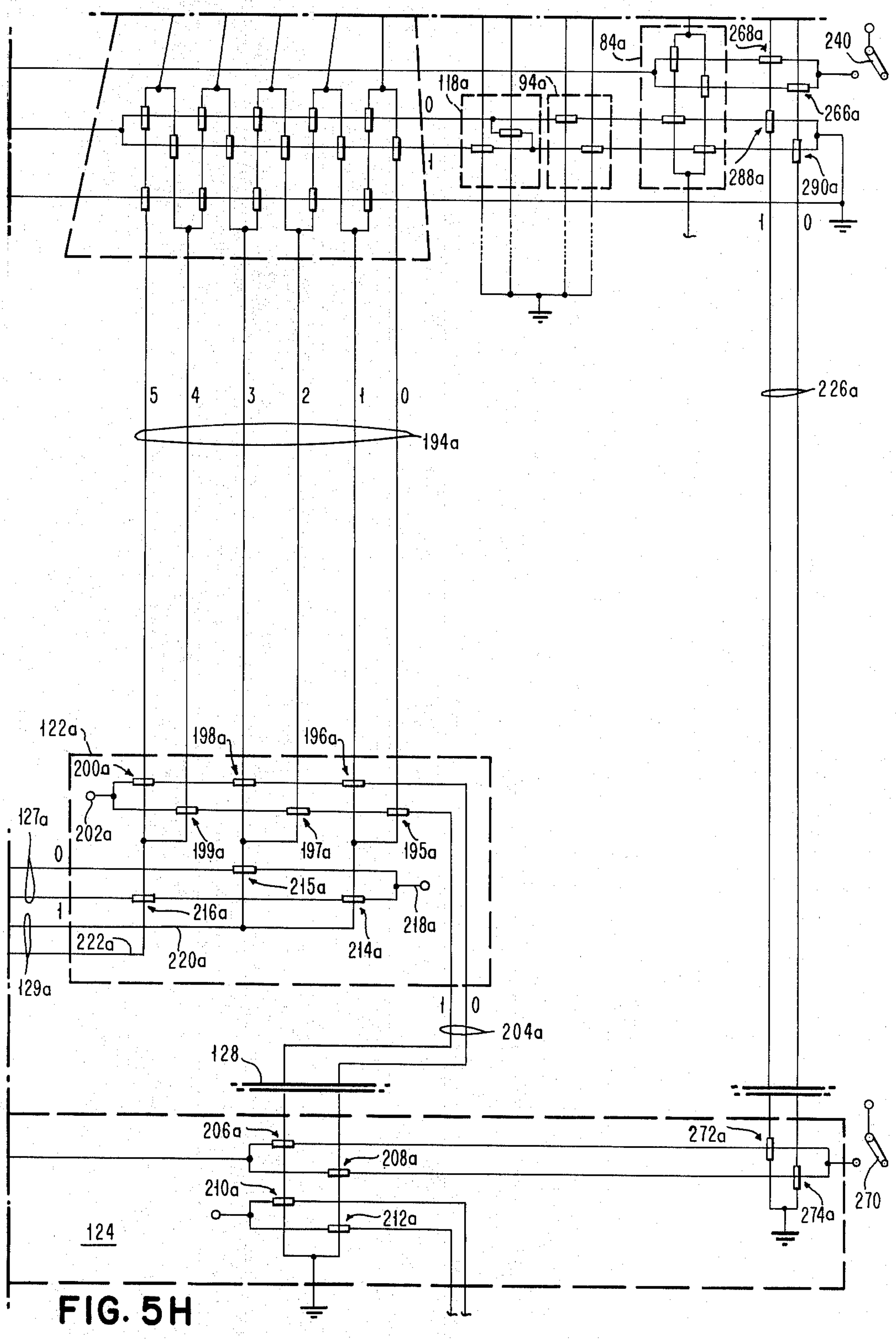

At the right hand margin of FIGURES 5G and 5H there are shown write-in bus conductors 226 a, and in each of the other orders corresponding write bus conductors 226b and 226c are also provided. Binary information appearing in the form of a current on one of these write bus conductors can be written into the associated digit positions in the memory storage cells 10a, 12a, 82a and 84a, or into any of the registers 108, 84 and 130. In each instance, the write-in from the write bus such as 226a is accomplished by energizing a write-in loop having cryotrons with control windings in the write bus circuits, and which, in turn, control cryotrons in the digit storage circuits. Thus, for instance, in the mask register, a write current may be applied by a switch schematically indicated at 228 for a write-in circuit including cryotrons 242a and 244a to thus cause the writing in and storage of information in the storage loop including cryotrons 148a and 150a. It will be seen that the write circuit energized from switch 228 also provides current to similar write-in circuits for all higher orders in mask register 108. Similar write-in circuits are provided for each of the other registers and for each of the word positions in memory. And each of these circuits is energized through switches 230 through 240. Each of these write circuits includes write loops having a pair of cryotrons, the cryotrons being numbered 246a through 268a, respectively.

Information may be placed into a write bus such as 226a from the sum register, or from any of the word storage positions in the memory, or from an external source (not shown). When the result in the sum register is to be placed in the write busses 226a through 226c, current is supplied to a read out loop including cryotrons 206a and 208a by the closure of a switch schematically shown at 270. In this manner, control of the write bus currents is established by means of the cryotrons shown at 272a and 274a. Similar cryotrons are provided in the write bus with control windings connected in the read out and association circuit loops for each of the character storage cells as indicated at 276a through 290a. In order to read out the information in a single word storage position into the write busses 226a et seq. it is necessary that only the read out circuits of that one word be energized. Circuitry for confining the read out to only a single word is described more fully below.

It is apparent from the above description that it is possible to read out the information stored in one word position into the write busses 226a et seq., and, by closure of the proper write circuits through one of the switches 234 through 240, to cause a write-in of that word in a new word position in the memory. Also, the transfer of a word from one position in memory to another can be accomplished be energizing only one read out circuit to cause that one word to appear in the sum register 124, and then to read the word out of the sum register 124 through the cryotrons 272a and 274a et seq. into the write busses 226a et seq. and thus into the desired word storage position in the memory. It is thus possible to move a word from one word position in memory to a different word position in memory without employing the read out circuit cryotrons 276a through 290a.

All of the apparatus described above and identified by a number succeeded with the letter "*a*" are to be found in exact counterparts in the apparatus for the higher orders. The corresponding parts in the second order are succeeded by the letter "*b*," and for the third order by the letter "*c*."

As previously mentioned in connection with FIG. 4, the system includes a selected word count adder including counting network 102, an associated decode network 104, and a selected word count register 106, for counting and registering the number of words which are associatively selected. The cryogenic elaboration of this portion of the system is shown in FIG. 5B. The "select" or "associate" current line 54, which carries the read out and associate current for the first word, is shown extended in FIG. 5B, and the corresponding "reject" or "non-associate" current line 66 is also shown as extended to FIG. 5B. Corresponding current lines are shown for each of the other three words. As far as the selected word count network 102 is concerned, a current in the "associate" line 54 should cause the indication of a count of "one" word which has been associatively selected. A current in the "non-associate" line should indicate a "zero" value when the first word has not been selected. The network 102 is similar to the previously described networks 120 *a*, *b*, and *c*. Thus, a current supplied at 292 is controlled at a cryotron 294 by current in the "associate" line 54 to count a "one" at the first word level. Or the 292 current is controlled at cryotron 296 by current in the "non-associate" line 66 to indicate a "zero" associated word count at the first word level. In a similar manner, the network 102 detects an "associate" or a "non-associate" condition at each word level and counts the "associate" conditions as "one" values. The decode network 104 is essentially identical to decode network 122a with the exception that no five-count line is required. Corresponding cryotrons in network 104 are numbered similarly to the cryotrons and circuit connections in decode network 122a, except that each item is primed instead of having the suffix letter *a*. As described for network 122a, the function of the decode network 104 is to convert the counting network output into binary notation. However, because of the limited count which can be achieved in the system as shown, the higher order portions of the binary notation count values can be stored directly in the count register 106 together with the first order sum. The first order sum is stored in register 106 in the circuits forming the control windings of cryotrons 300 and 302. The second order binary digit is stored in the circuit forming the control windings of cryotrons 304 and 306, and the third order digit is stored in the circuits forming the control windings of cryotrons 308, and 310. As previously mentioned, the system is illustrated in an abbreviated form, and it is generally intended to provide storage for many more than four words. It will be understood that for this purpose the selected word adder, including the counting network 102 and the decode network 104, is expanded in size, with additional counting networks to take care of higher order carries, etc. This expansion is accomplished in accordance with the teachings provided by the previous descriptions of the counting networks 120*c*, *b*, and *c*, and the teachings provided by the prior co-pending patent application Serial No. 79,823.

The selected word register 96 is shown in FIGURE 5A and it includes the individual word register indicators 97, 98, 99 and 100. The information about the associative selection of individual words is stored in individual cryogenic alternate current storage cells which respectively include write control cryotrons indicated at 312 through 326. Current for these cells is provided through a switch schematically shown at 327. These storage cells are arranged for control by the "associate" and "non-associate" lines, such as 54 and 66 at the first word level, and they each store a "one" value in response to an "association" selection, and a "zero" value in response to a "non-association" operation. Circuits are provided, as indicated generally at 328 through 334, for reading out this stored information to the selected word register indicators 97 through 100. It will be understood that the cryogenic storage cells, including the cryotrons 312 through 326, and the associated circuitry may be considered as a part of the selected word register 96.

Logical circuitry may be usefully employed with the cryogenic storage cells including the cryotrons 312 through 326 for the purpose of providing immediate logical information about the association operation. For instance, logical circuits are shown in FIGURE 5A for the purpose of indicating either that no words were selected in a given association operation, or that at least one word was selected. These alternate logical circuits commence at a terminal 336 and include a multiple cryogenic OR circuit having parallel connected cryotrons 338, 340, 342, and 344; and a multiple cryotron AND circuit including series connected cryotrons 346, 348, 350, and 352. The indications from these alternate circuits may be read out through a circuit beginning at 354 and including the gates of cryotrons 356 and 358.

In FIG. 5A the association selection and read out currents for the four words are shown to be supplied at input terminals indicated at 360, 362, 364 and 366. These are the currents which traverse either the "associate" current line, such as 54, or the "non-associate" current line such as 66 for the first word. For each association selection operation, a reset of the currents is required for all previously non-associated words. That is, whenever the read out and association current is traversing the "non-associate" line such as 66, it must be reset into the "associate" line 54 prior to the next association operation in order for the association operation to take place. This is accomplished by a reset circuit including a switch schematically shown at 368 as a manual pushbutton, and the control windings of associated cryotrons 370, 372, 374 and 376. Since these cryotrons have their gates respectively in the "non-associate" lines, such as line 66, whenever the reset button 368 is closed, all of the read out currents are reset from the "non-associate" lines to the "associate" lines.

A similar circuit is provided for the converse operation in which the read out of all words is suppressed just as though no words were capable of matching the contents of the association register. This "suppress" circuit includes the schematically shown pushbutton switch 378 and the control windings of the associated cryotrons 380, 382, 384 and 386. The last mentioned cryotrons have their gate circuits in series in the respective "associate" lines such as 54 at the first word level. This suppress circuit including pushbutton 378, is useful in the instance where a read out of only a single selected word is desired. For this purpose, with the suppress circuit energized through pushbutton 378, since all of the readout and associate currents are in the "non-associate" lines such as 66, means must be provided for switching the read out and associate current back into the "associate" line, such as 54, for the single word position which is to be read out. This is accomplished by a transfer switch such as is schematically shown for the first word level at 390. Similar pushbutton transfer switches are shown for the other word levels at 392, 394, and 396. With these circuit arrangements, it is apparent that it is possible to manually select the reading out of any desired word or words in memory by actuating the suppress switch 378 and the individual word read out select switches 390 through 396 for all words to be read out. In a typical mode of operation of this system, the association selection operation may be performed and the word selection register 96 may be appropriately energized to indicate which words have been associatively selected. These words may then be individually or collectively read out from the selected group, if desired, by actuation of the switches 378 and 390 through 396 as just described.

In the embodiment of FIG. 5, a number of switch elements are schematically shown as manually actuated switches. These circuit symbols are used for purposes of clarity and simplicity in the drawings, but it will be understood that in cryogenic circuit systems, special cryogenic switching elements will generally be required. Furthermore, it will be understood that certain of the switching elements such as 368, 378, and 390 through 396 may very well be automatically actuated rather than manually actuated.

The systems of the present invention may be expanded and modified for the purpose of rapidly deriving various arithmetic functions of selected fields of the associatively selected words. Two of these possibilities are illustrated for instance in FIGS. 6 and 7.

Figure 6:
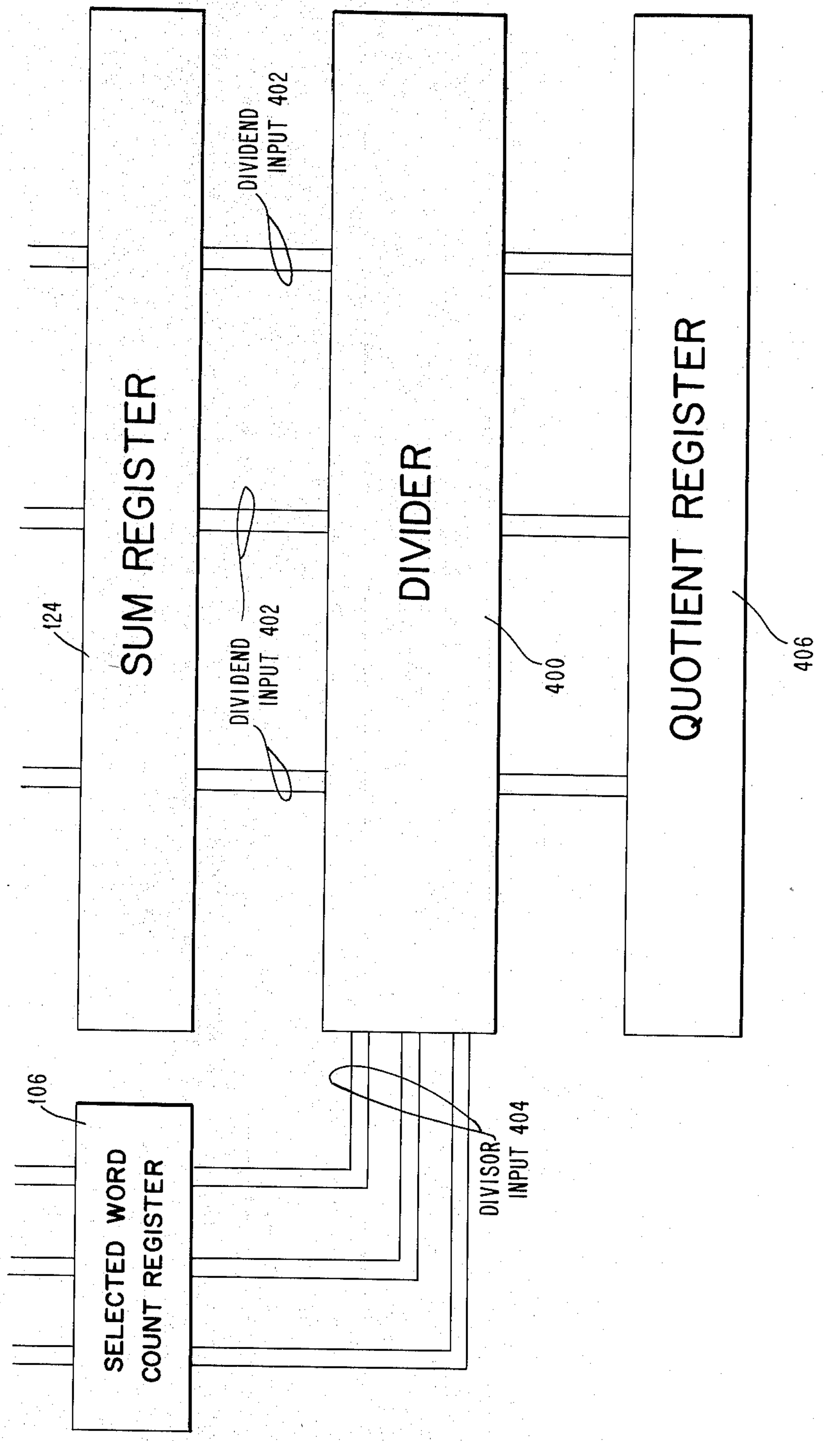
FIGURE 6 is a schematic diagram illustrating additional apparatus which may be incorporated with the system of FIGURE 4 for the purpose of immediately deriving an average value of all of the associatively selected words.

FIG. 6 illustrates in schematic form how the apparatus of the system of FIG. 4 may be expanded so as to be capable of immediately deriving an average value of a selected field or fields of all of the associatively selected words. For purposes of orientation, the sum register 124 and the selected word count register 106 of FIG. 4 are repeated at the top of FIG. 6. A divider apparatus 400 is provided which may be of conventional construction and which has a dividend input, as indicated at 402, from the read out circuits of the sum register 124. The divider 400 also has a divisor input connection, as indicated at 404, from the selected word count register 106. The divider 400 thus immediately divides the sum of the selected fields of all of the associatively selected words by the count of the number of associatively selected words, and the quotient thus represents the average value of the selected field of the associatively selected words. This quotient is registered in a quotient register indicated at 406.

FIGURE 7 illustrates an alternative apparatus which may be incorporated with the system of FIG. 4 for the purpose of rapidly deriving a product of the sums taken from two different fields of all of an associatively selected group of words stored in the memory. Again, for the purpose of establishing the connection between FIG. 7 and the system of FIG. 4, the sum register 124 is repeated in FIG. 7. However, in FIG. 7, the sum register 124 has been expanded to show a total of six bit storage positions. Three of these positions are indicated by sum input pairs 204*a*, *b*, and *c* representing the field which is to store the multiplicand, and the other three, indicated by pairs 204*d*, *e*, and *f* store the field sum which is to serve as the multiplier factor. The basic structure of the multiplier preferably is in a form such as disclosed in our prior patent application Serial No. 79,823 mentioned above. It includes write-in and storage circuits which are arranged to write the multiplicand in a successively left-shifted form at successive word levels. Each storage of the multiplicand represents a possible partial product. At the first word level, write-in and character storage cells for each character are indicated at 408*a*, 408*b*, and 408*c*. At the second word level they are indicated at 410*b*, 410*c*, and 410*d*. And at the third word level they are indicated at 412*c*, 412*d*, and 412*e*.

Read out and summation of the various partial products at the various word levels is controlled in accordance with the presence or absence of a binary "one" in corresponding orders of the multiplier. Thus, the presence of a "one" in the lowest order of the multiplier, as indicated by the signals on circuit pair 414, controls the read out from storage cells 408*a*, *b*, and *c*. Similarly, the second order multiplier digit value indicated on pair 416 controls the read out of the second word from storage cells 410*b*, *c*, and *d*, and the third order multiplier digit on pair 418 controls the read out of the third word from cells 412*c*, *d*, and *e*. This control of the read out is accomplished in the first word digit positions by select suppress units 420*a*, 420*b*, and 420*c*. In the second word level, the control exercised through connections 416 is accomplished by select-suppress units 422*b*, 422*c*, and 422*d*. And in the third word level the control by pair 418 is accomplished through select-suppress units 424*c*, 424*d*, and 424*e*.

The partial products formed by the storing of the multiplicand in the various word positions, and as read out under the control of the multiplier digit information, are added together by means of the adding circuits shown for the various orders at 426*a*, *b*, *c*, *d*, and *e*, and the resulting product appears in the product register 428. In addition of the partial products carries from lower orders are transmitted from lower order adding circuits to higher order adding circuits as indicated by the connections at 430*a*, *b*, *c*, and *d*. From the highest order adding circuit 426*e*, the carry simply forms the highest order product digit and accordingly the carry connection 430*e* goes directly to the product register.

The system additions to FIG. 4 shown in FIG. 7 may be mechanized in cryogenic circuitry. A detailed cryogenic embodiment of a system circuit of this kind, for multiplication, forms a part of the subject matter of our previously mentioned co-pending patent application Serial No. 79,823.

In combining the apparatus of FIG. 6 or of FIG. 7 with the system shown in FIG. 4, it is not actually necessary to include the sum register 124 or the selected word count register 106. The information normally received by those registers may be directly fed either to the divider 400 of FIG. 6, or to the multiplier apparatus of FIG. 7.

FIGS. 6 and 7 illustrate only two of the many possibilities for expansion of the associative arithmetic memory of the present invention. FIG. 7 illustrates the summing of separate fields of all of the associatively selected words, and then the multiplication of one sum by the other. It is obvious however that one sum can also be divided by the other, or that each sum can be multiplied or otherwise modified by other factors and then the products can be summed. In another modification, one field of all of the associatively selected words is summed, and a single value common to all of the associatively selected words is taken from another field, and these two factors are multiplied. An illustration of the utility of this last alternative is, for instance, in the previously mentioned payroll computation operation. The summation field can represent hours worked, the single value field can represent the pay rate of the man whose wages are to be computed, and the product represents the man's wages.

Another system variation can be adapted to the problem of computing salesmen's commissions based on gross billings, and modified to give the salesman a smaller commission on sales of higher quantities than he would receive upon sales of lower quantities. For this purpose, this system would provide for summing of all dollar values of all sales item words associatively selected on the basis of the salesman's identification, and another field which sums the salesman's unit quantity of sales. A computation is performed upon the unit quantity of sales for the purpose of deriving the salesman's commission rate which is then applied to the dollar value of sales to derive his actual net commissions. This computation is a subtraction of a factor of the unit quantity of sales from a base commission rate.

It is apparent also that there are many other variations in system modifications which may be devised which employ the information stored in the selected word count register 106, as in the system of FIG. 6. Also, it involves only a minor modification of this system to provide an adder which is capable of adding the number of words which are not selected associatively, rather than the number of words which are selected associatively, as indicated in register 106. Various computations can then be made which are based upon the number of words not selected.

However, it must also be emphasized that even without any substantial additions to the system of FIG. 4 many very useful computations may be made which have many uses in business and which simply involve the formation of sums of selected fields of associatively selected words stored in memory. For instance, if each word stores information about a particular sales transaction, by associatively selecting words according to dates, an immediate summation of total units sold within a particular period, or of total dollar sales during a particular period, may be obtained. Similarly, by associating upon customers' names, total sales to a particular customer may be obtained rapidly.

Many other examples of the potential utility of the systems of this invention will be apparent to those skilled in the art. For instance, if the system is used for the storage of medical statistics, a simple associative operation will provide the total number of cases recorded of a particular disease in a particular region during a particular time period. And a further association operation will provide statistics as to how many cases of that disease displayed particular symptoms or combinations of symptoms. There are also many other possibilities for application of the system in industry for the storage of production data, inventory data, and personnel data, any of which may be recovered in any specialized way for particular purposes by associative selection of the data on desired fields.

By selective masking of the association within the field of words in which association is taking place, sorting of broad categories within certain limits may be obtained. For instance, if personnel data are stored within the system, and if it is desired to select all individuals who are less than 32 years of age, an association operation is carried out in the field of the word in which the individual ages are recorded. But the first five binary digits, representing all age data up through 31 years of age, are masked out, and the sixth and seventh binary digits are set for association on binary "zero," indicating selection based upon an absence of data indicating any age of 32 or above. In this manner, words recording data on all individuals having ages below 32 are associatively selected. It is apparent that this principle of selection can be applied generally to obtain a sorting or selection which is effectively a selection based upon limits. Such a limit applies to the values of the quantities stored in the field upon which the associative selection is performed.

While the specific embodiments of the system of this invention as thus far described are all carried out with cryogenic switching devices, it will be apparent that other switching devices may be employed in systems following the teachings of the present invention. For instance, relays or lamp photoconductor devices may be employed for this purpose. By way of illustration, FIG. 8 discloses a portion of a relay system embodying the present invention.

FIGURE 8 incorporates FIGS. 8A, 8B, 8C and 8D and shows how those figures are to be arranged together to disclose a portion of a relay embodiment of the system of the present invention. These drawings are collectively referred to below as FIG. 8. In this relay embodiment, four binary storage cells are shown arranged on two word levels." Cells **440*a* and 440*b* represent a first word level, and cells 442*a* and 442*b* represent a second word level. Each of these storage cells includes a normally energized "zero" relay. These relays are respectively lettered 444*a*** and *b*, and **446*a*** and *b*. Each storage cell also includes a "one" relay respectively lettered **448*a*** and *b*, and **450*a*** and *b*.

Figure 8A:
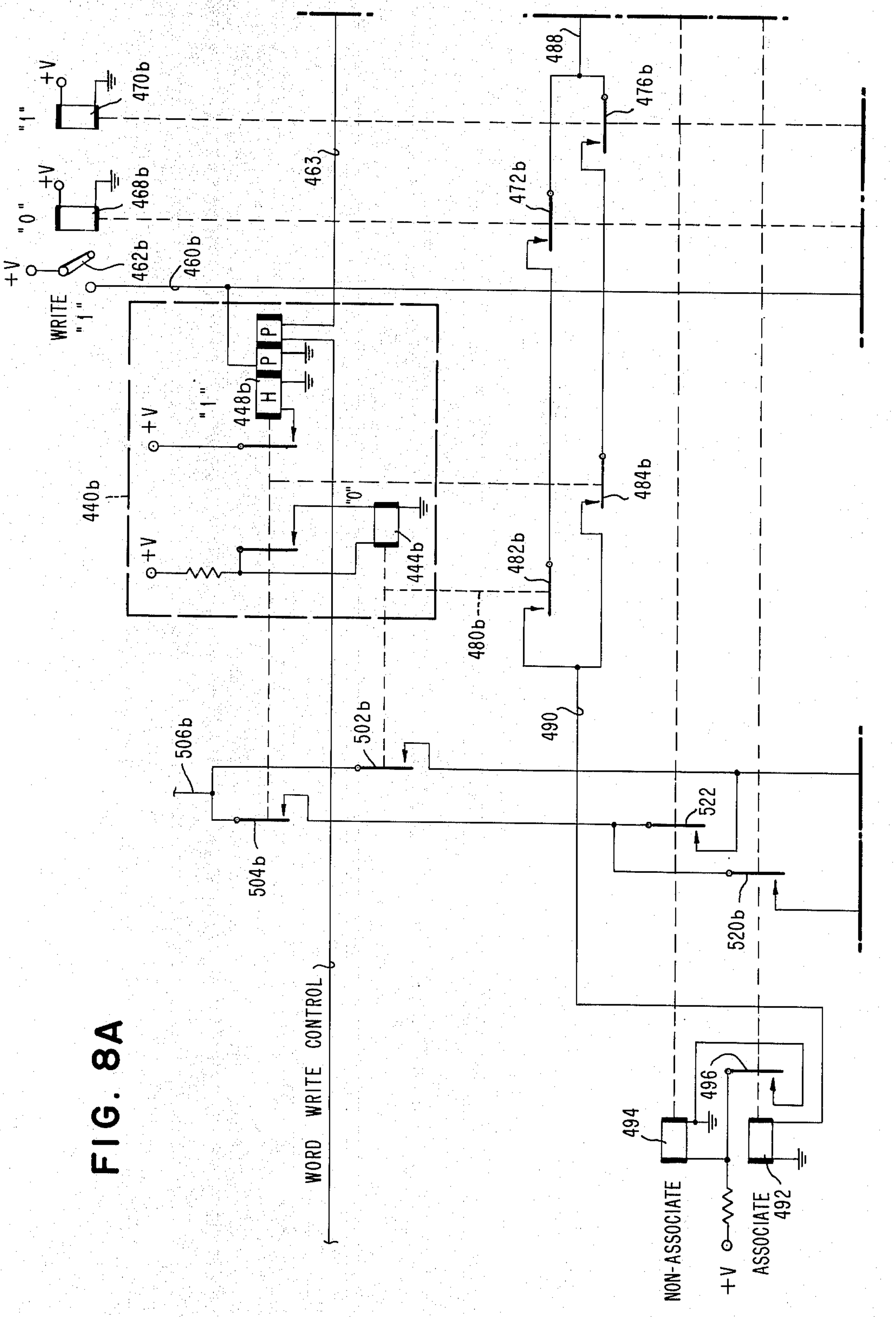
Figure 8B:
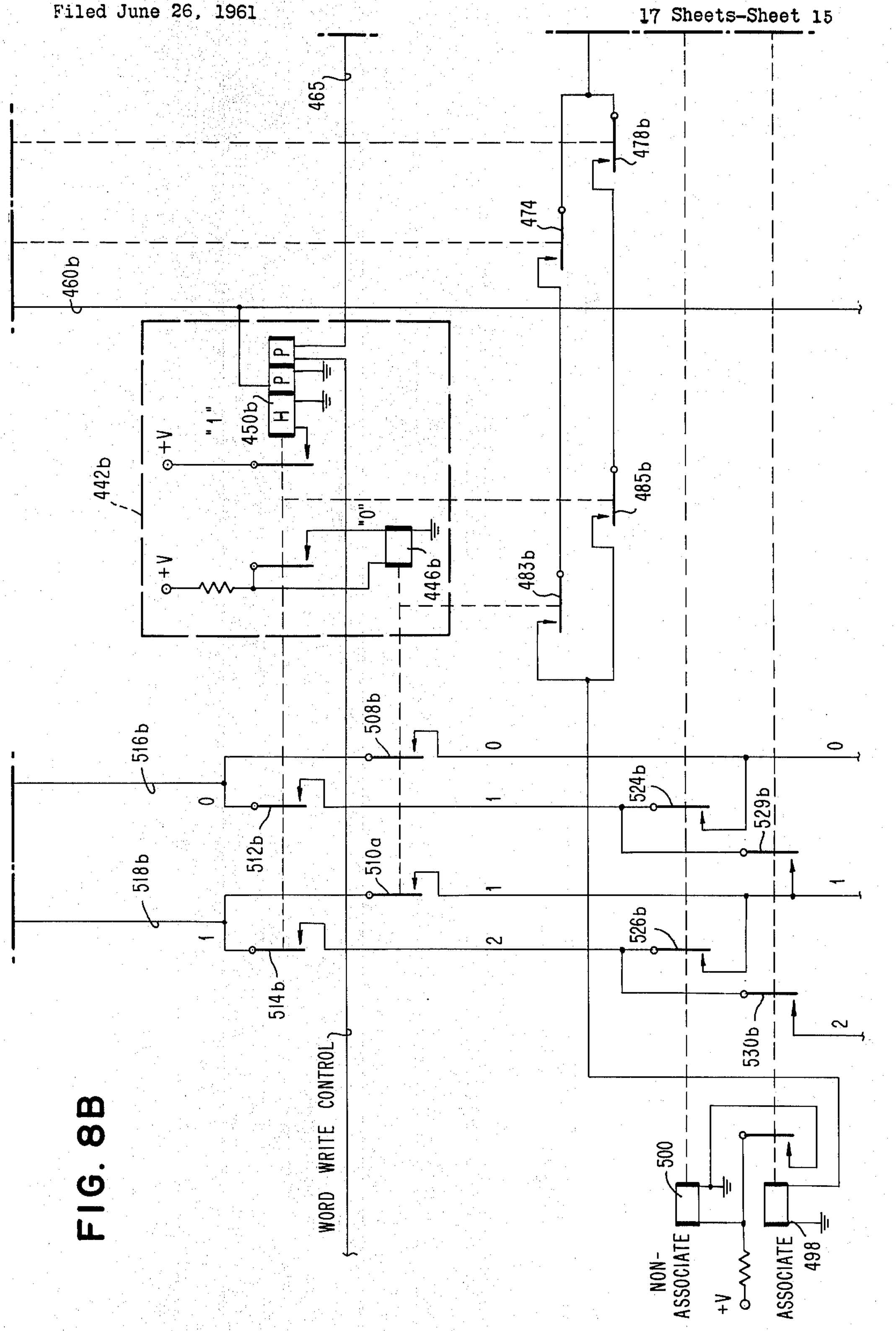
Figure 8C:
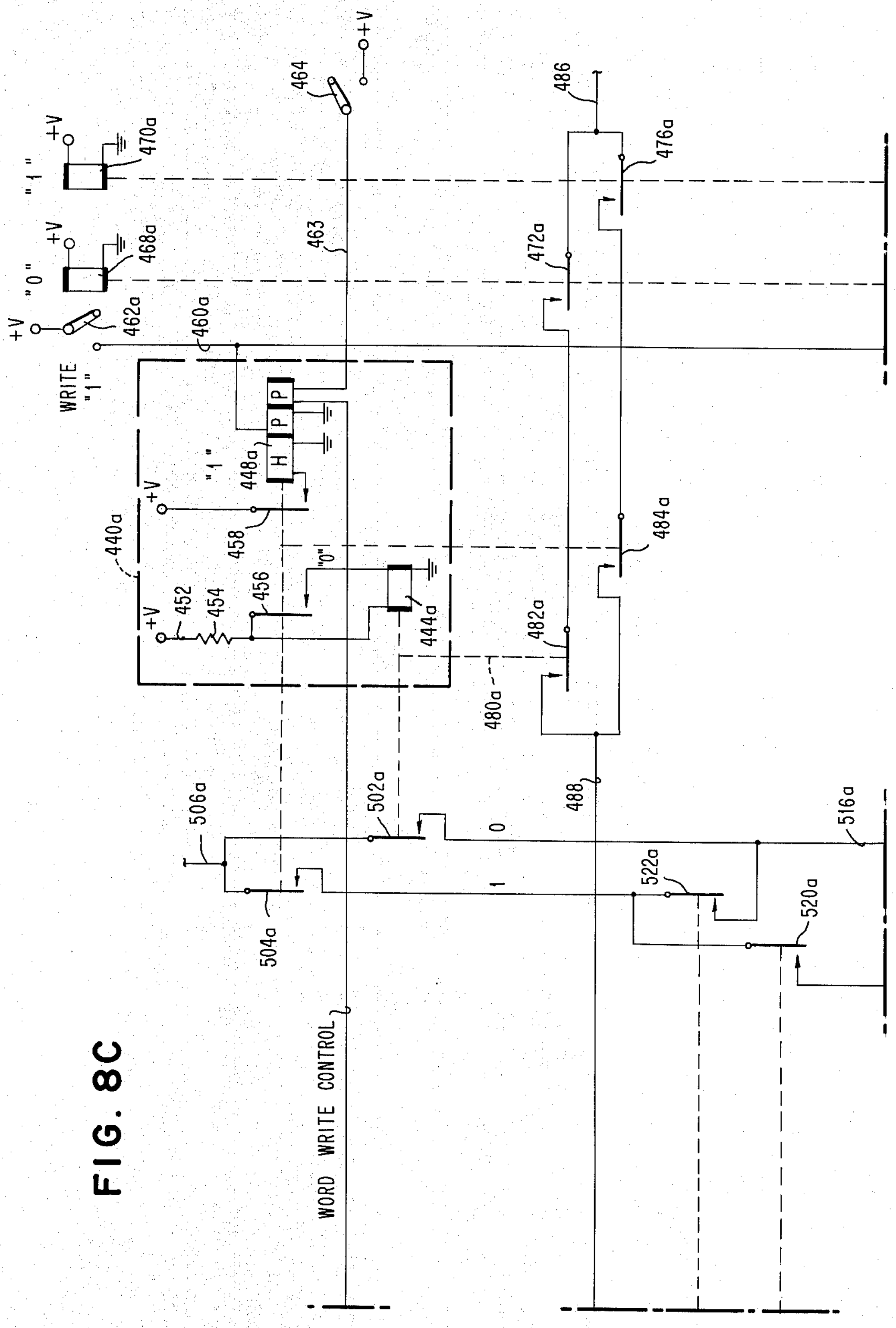
Figure 8D:
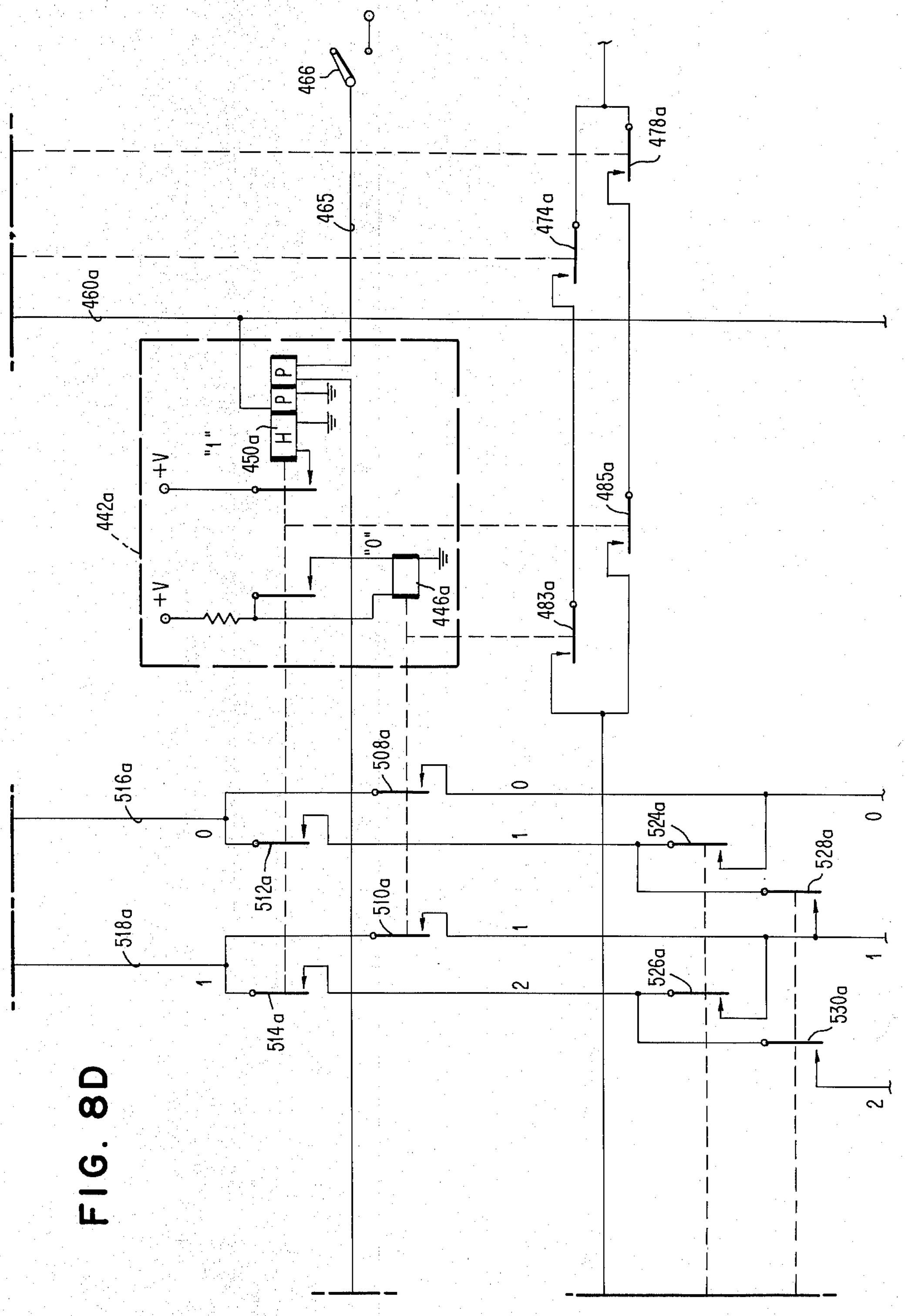

The operation of the storage cell will be described particularly in connection with cell **440*a* in FIG. 8C. The "zero" relay 444*a* is normally energized from a source of voltage indicated by a terminal at 452 through a circuit including resistor 454. However, if the "one" relay 448*a* is picked up, then a normally open "one" relay switch lever 456 is closed, which shunts out the winding of "zero" relay 444*a*** so that it drops out. Therefore, whenever the "one" relay is picked up, the "zero" relay is dropped out, and whenever the "one" relay is dropped out, the "zero" relay is picked up.

The "one" relay has two pick up winding sections and a hold winding section. The pick up winding sections are each marked with the latter "P" and the hold winding section is marked with the letter "H". The relay is designed in such a way that both pick up winding sections must be simultaneously energized in order to cause the relay to pick up. Neither pick-up winding has sufficient ampere turns alone to pick up the relay armature. Once the relay is picked up, a holding contact 458 is closed to energize the holding winding to maintain the picked up condition.

At each digital order of the system, a "write" bus is provided as indicated for the first order at **460*a*, and for the second order at 460*b*. If it is required that a "one" be written into a digit position in the first order, a switch 462*a* is closed to energize the write bus 460*a*. A similar switch 462*b* is provided for writing a "one" in the second order by energizing bus 460*b*. If it is desired to write a word into the first word position, then a first word write control circuit 463 is energized by the closure of a switch as indicated at 464. Similarly, if it is desired to write a word in the second word position, a second word write control circuit 465 is energized by the closure of a switch as indicated at 466. The write control circuit 463** is connected and arranged to energize one of the pick up sections of each and every one of the "one"

relays in the first word, and circuit 465 is similarly arranged for the second word. If it is desired to write information into a particular word position in memory, all of the "one" relays at that word level are caused to be de-energized by conventional circuitry which is not shown for purposes of clarity. Then all of the "one" switches such as 462*a* and *b* are closed for all orders in which "ones" are to be written. And the word write control for the particular word position to be written into is energized, such as by closure of switch 464 for the first word level. The result is that wherever a "one" is to be written, both pick up windings of the particular "one" relay are energized, and a "one" binary value is accordingly stored.

For purposes of associative selection of the various words in memory, association relays are provided for each order of the system. For instance, in the first order there is a "zero" value association relay 468*a* and *a* "one" value association relay 470*a*. These relays, and their counterparts for other orders constitute an association selection register. Either the "zero" or the "one" relay is to be picked up depending upon which binary digit is to be associated upon. The association comparison is accomplished in an association circuit loop which has a configuration similar to that which was shown previously in connection with cryogenic embodiments of the system. The association comparison loop at each word level includes a relay contact of the "zero" associate relay 468*a*. This relay contact is indicated at 472*a* for the first word level. A similar contact is shown at the second word level at 474*a*. Similar normally open relay contacts on the other side of the association circuit loops are shown at 476*a* and 478*a* for the "one" relay 470*a*. As schematically indicated by the magnetic path lines at 480*a*, the "zero" storage relay 444*a* includes a normally open contact lever 482*a* in the association selection loop. Similarly, the "one" relay 448*a* includes a normally open contact lever in the association loop at 484*a*. Similar storage relay contacts at the second word level are shown at 483*a* and 485*a*.

If a current is supplied to the association selection loop at 486, that current will continue on to connection 488 through one of the legs of the loop if the binary association digit, as indicated by relays 468*a* and 470, matches the stored digit, as indicated by the condition of the storage cell relays 444*a* and 448*a*. Thus, if both quantities are "zero," relay contacts 472*a* and 482*a* will both be closed to complete the top branch circuit of the loop. Likewise, if both quantities are "one," contacts 476*a* and 484*a* will both be closed to complete the bottom branch circuit of the loop. On the other hand, if there is a lack of correspondence, one of the contacts in each of the branch circuits will be open, so that neither branch of the association circuit will be completed. In like manner, at the second order of the first word level, the association circuit will again be interrupted if the association condition is not satisfied. But if the association condition is satisfied, the circuit is completed to 490 and this association condition is thus recognized by the energization of an "associate" relay as shown at 492. A normally energized "non-associate" relay 494 is also provided which is shunted out by the contact 496 on "associate" relay 492. Similar "associate" and "non-associate" relays 498 and 500 are provided at the second word level. The condition of "association" or "non-association" at each word level is therefore apparent from the condition of the "associate" and "non-associate" relays. Also, visual indicators such as indicator lamps may be energized if desired from auxiliary contacts on the "associate" relays (not shown).

In this relay embodiment of the present invention, counting circuits are also readily provided for all "one" digits of all selected words. In the first word level and the first order, for instance, "zero" relay 444*a* includes a normally open contact 502*a*. The "one" relay 448*a* includes a corresponding normally open contact 504*a*, and these contacts are arranged in an adding circuit which is supplied with current at a connection 506*a*. Current through the circuit including contact 502*a* therefore indicates a "zero" count, and current through the circuit including contact 504*a* indicates a "one" count. At the second word level, the "zero" relay 446*a* includes normally open contacts 508*a* and 510*a*, and the "one" relay includes corresponding normally open contacts 512*a* and 514*a*. Therefore, at the second word level, a previous count of "zero" as indicated by a current at connection 516*a* is raised to a count of "one" by current through relay contact 512*a* in the presence of a "one" stored in cell 442*a*, or it remains at a "zero" count by passage of the current through relay contact 508*a* if a "zero" is stored in cell 442*a*. Similarly, a previous count of "one," as indicated by current on circuit connection 518*a*, either remains at a "one" count in the presence of a "zero" by passage of the current through the "zero" relay contact 510*a*; or it is raised to a count of "two" by passage of the current through the "one" relay contact lever 514*a*.

The "associate" and "non-associate" relays also have contact levers in the adding or counting circuits. For instance, associate relay 492 has the relay contact lever 520*a* in the "one" count circuit 518*a* from the first word level. And non-associate relay 494 has a corresponding normally open contact 522*a*. If the "non-associate" condition exists for the first word, so that "non-associate" relay 494 is picked up, then relay contact 522*a* will be closed. This will cause a "one" count appearing on the circuit from the "one" relay contact 504*a* to cross over to the "zero" line 516*a*. A similar circuit appears in the second order. Therefore, any "ones" which would otherwise be counted at the first word level are effectively cancelled out through these non-associate relay contacts which cross the counting currents from the "one" circuits to the "zero" circuits. On the other hand, if the first word is associatively selected, then the non-associate relay 494 is dropped out, and the associate relay 492 is picked up. The counting circuit relay contact 520*a* is thus closed instead of the contact 522*a*. This preserves the count of "one" from the first word level by conveying it onto the "one" count circuit 518*a*. Similar "non-associate" relay contacts 524*a* and 526*a*, and "associate" relay contacts 528*a* and 530*a* are provided just beneath the second word level in the first order. These circuits operate in a manner analogous to that just described at the first word level, to either maintain the count of any "one" which appears in an associatively selected word, or to cancel out any such "one" count occurring in a non-associated word.

From the above description of FIG. 8, it is believed to be quite clear how the systems of the present invention may be embodied with relays. Such a system would be much larger than indicated in FIGURE 8 to provide for words having many more characters and to provide for storage of many more words. But such a larger system would simply involve additional apparatus substantially similar to that shown in FIGURE 8.

While the invention has been particularly shown and described with reference to preferred embodiments thereof, it will be understood by those skilled in the art that various changes in form and details may be made therein without departing from the spirit and scope of the invention.

What is claimed is:

1. A memory system comprising apparatus for storing a plurality of binary digital characters in rows forming data words and having corresponding word characters arranged to form columns, said system including an associative selection register for receiving and storing a binary digital association information word, masking apparatus including a mask register for selecting certain digits of said association information word corresponding to selected columns to be associated upon, read out apparatus associated with each character portion of said storage apparatus and operable to read out the associated character, each read out apparatus being connected to receive any association information word digit selected for the associated column and operable to compare the association digit and the stored digit and to indicate a mismatch for the entire associated word whenever a mismatch is detected, each read-out apparatus being operable in conjunction with every other read-out apparatus of the same word to indicate a match of said word, and summing apparatus forming a part of the structure of said memory and connected to said read-out apparatus for all of said stored characters and operable to sum all words selected by matching, and a sum field selection register connected and arranged to select or suppress the summing of matched word characters on a column by column basis, said association and read out and summing operations being performed substantially simultaneously.

2. A cryogenic associative memory system comprising separate bistable cryogenic circuits for storing each of a plurality of binary digital characters and arranged in rows to form data words and having corresponding word digits arranged to form columns, an alternate current path read out circuit loop for each digit position connected and arranged to read out the information stored in that digit position, all of said read out loops for all digits of a particular word being connected in series to share a common energizing current, a cryogenic association bus circuit for each column of said memory and electromagnetically coupled with all of said read out circuits of the associated column, an association selection register for storing a word for which an association is to be made and operable to supply binary association digits to the association busses for each column, a mismatch current line for each word position of said memory and connected to alternatively carry the common read out current of the associated word when a mismatch condition is detected, said association bus cryogenic electromagnetic couplings with said read out circuits being effective to inhibit the word read out current for any word in which at least one digit is different from the corresponding association digit to thereby shift the read out current into the mismatch line for that word, and adding circuits connected to said read out circuits to form the sum of all stored words selected by matching with the contents of said association selection register.

3. A cryogenic associative memory system comprising separate bistable cryogenic circuits for storing each of a plurality of binary digital characters and arranged in rows to form data words and having corresponding word digit circuits arranged to form columns, a separate alternate current path read out circuit loop including "zero" and "one" branches connected and arranged to read out the information stored in each digit position, all of said read out loops for all digits of a particular word being connected in series to share a common energizing current, a cryogenic association bus circuit for each column of said memory and including "zero" and "one" branch circuits electromagnetically coupled respectively with said "one" and "zero" branches of all of said read out circuits of the associated column, an association selection register for storing a word for which an association is to be made and operable to supply binary association digits to the association busses for each column, a mismatch current line for each word position of said memory and connected to alternatively carry the common read out current of the associated word when a mismatch condition is detected, said association bus cryogenic electromagnetic couplings with said read out circuits being effective to inhibit the word read out current for any word in which at least one digit is different from the corresponding association digit to thereby shift the read out current into the mismatch line for that word, and cryogenic adding circuits electromagnetically coupled to said read out circuits and immediately operable to form the sum of all stored words when selected by matching with the contents of said association selection register.

4. A memory system comprising cryogenic flip-flop storage circuits arranged for storing a plurality of binary digital characters in rows forming data words and having corresponding word character flip-flops arranged to form columns, a cryogenic read out circuit comprised of "zero" and "one" branch circuits respectively electromagnetically coupled by cryotrons with the two sides of the flip-flops for each character position of said memory and operable to read out the associated character in terms of a current in one of said branch circuits, all of said read out circuits for a particular word being connected in series to share a common current, an association bus for carrying a digit to be associated upon for each column of memory, each association bus comprising two branch circuits for respectively carrying currents indicating "zero" and "one" association digit values, said association bus "zero" and "one" branch circuits being electromagnetically coupled respectively with all of said "one" and "zero" read out branch circuits of the associated column by means of cryotrons having control windings in said association bus circuits and having gates in said read out circuits, said association busses being operable through said couplings to provide concurrently an electrical comparison of all stored digits by causing the conductive branch of any digit read out circuit for any non-matching digit to become resistive, a mismatch circuit for each word to carry the read out circuit current whenever both read out branch circuits for any digit of that word become resistive because of a non-matching condition, a reset circuit electromagnetically coupled by cryotrons to cause all of said mismatch circuits to become resistive before each association operation, and cryogenic adding circuits for each column of said memory and electromagnetically coupled by cryotrons to all of said read out circuits and immediately operable to form the sum of all "one" digits of all words associatively selected through the comparison operation of said association busses.

5. An electrical memory system comprising cryogenic flip-flop storage circuits arranged for storing a plurality of binary digital characters in rows forming data words and having corresponding word character flip-flops arranged to form columns, said system including an associative selection register comprised of cryogenic flip-flop circuits for receiving and storing a binary digital association information word, a mask register comprised of cryogenic gates for selecting certain digits of said association information word corresponding to selected columns to be associated upon, a cryogenic read out circuit comprised of "zero" and "one" branch circuits associated with each character position of said memory and operable to read out the associated character in terms of a current in one of said branch circuits, all of said read out circuits for a particdlar word being connected in series to share a common current, an association bus associated with each digit position of said mask register and said associative selection register for each column, each association bus comprising "zero" and "one" branch circuits for respectively carrying currents indicating "zero" and "one" association digit values, said association bus "zero" and "one" branch circuits being electromagnetically coupled respectively with all of said "one" and "zero" read out branch circuits of the associated column by means of cryotrons having control windings in said association bus circuits and having gates in said read out circuits, said association busses being operable through said couplings to provide concurrently an electrical comparison of any selected column association digit with all stored digits in that column by causing the conductive branch of any digit read out circuit for any non-matching digit to become resistive, a mismatch circuit for each word to carry the read out circuit current whenever both read out branch circuits for any digit of that word become resistive because of a non-matching condition, a reset circuit electromagnetically coupled by cryotrons to cause all of said mismatch circuits to become resistive before each association operation, and cryogenic adding circuits for each column of said memory and electromagnetically coupled by cryotrons to all of said read out circuits and immediately operable to form the sum of all "one" digits of all words associatively selected through the comparison operation of said association busses.

References Cited by the Examiner

UNITED STATES PATENTS

| | | | |
|---|---|---|---|
| 2,638,267 | 5/1953 | Hartley et al. | 235—164 |
| 3,004,705 | 10/1961 | Bremer | 235—164 |
| 3,093,816 | 6/1963 | Hunter | 340—173.1 |

OTHER REFERENCES

Pages 115–119, Dec. 10–12, 1956, Slade and McMahon, A Cryotron Catalog Memory System, Proceedings of the Eastern Joint Computer Conference, vol. 10.

ROBERT C. BAILEY, *Primary Examiner.*

MALCOLM A. MORRISON, *Examiner.*